(12) United States Patent
Boudreau et al.

(10) Patent No.: US 10,868,643 B2
(45) Date of Patent: Dec. 15, 2020

(54) METHOD AND SYSTEM FOR ORTHOGONAL MULTI-PROTOCOL TRANSMISSIONS

(71) Applicants: Gary Boudreau, Kanata (CA); Hassan Halabian, Ottawa (CA); Roland Smith, Nepean (CA)

(72) Inventors: Gary Boudreau, Kanata (CA); Hassan Halabian, Ottawa (CA); Roland Smith, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/318,613

(22) PCT Filed: Aug. 30, 2016

(86) PCT No.: PCT/IB2016/005181
§ 371 (c)(1),
(2) Date: Jan. 17, 2019

(87) PCT Pub. No.: WO2018/015795
PCT Pub. Date: Jan. 25, 2018

(65) Prior Publication Data
US 2019/0253210 A1 Aug. 15, 2019

Related U.S. Application Data

(60) Provisional application No. 62/365,658, filed on Jul. 22, 2016.

(51) Int. Cl.
*H04L 5/00* (2006.01)
*H04L 27/26* (2006.01)

(52) U.S. Cl.
CPC ........ *H04L 5/0007* (2013.01); *H04L 5/0053* (2013.01); *H04L 27/2646* (2013.01); *H04L 27/2666* (2013.01)

(58) Field of Classification Search
CPC ..... H04L 5/0007; H04L 5/003; H04L 5/0053; H04L 27/2646; H04L 27/2666; H04W 74/02; H04W 88/06
See application file for complete search history.

(56) References Cited

U.S. PATENT DOCUMENTS

2013/0142129 A1 6/2013 Rinne et al.
2015/0223075 A1* 8/2015 Bashar .................. H04W 74/08
                                                                    370/329

(Continued)

OTHER PUBLICATIONS

Ran Zhang et al: "LTE-unlicensed: the future of spectrum aggregation for cellular networks", IEEE Wireless Communications., vol. 22, No. 3, Jun. 1, 2015; US.

(Continued)

*Primary Examiner* — Paul H Masur
(74) *Attorney, Agent, or Firm* — Ericsson Canada Inc.

(57) ABSTRACT

Methods and systems for multi-protocol transmissions in shared spectrum are disclosed where an OFDM transmitter is configured to generate transmissions associated with one OFDM technology or protocol using subcarriers of another OFDM technology. Generally, an OFDM transmitter may be configured to map or assign the different OFDM signals to different subsets of the available OFDM subcarriers such that the data contained therein can be transmitted at the same or during an overlapping time interval. In one application, an LTE transmitter is configured to generate and/or transmit LTE information using LTE subcarriers located in unused portion(s) of the Wi-Fi system bandwidth independently of or in addition to transmitting Wi-Fi or LTE information using LTE subcarriers located in portions of the Wi-Fi system bandwidth normally occupied by Wi-Fi subcarriers.

16 Claims, 23 Drawing Sheets

(56) References Cited

U.S. PATENT DOCUMENTS

| | | | |
|---|---|---|---|
| 2015/0223244 A1 | 8/2015 | Tabet et al. | |
| 2016/0007207 A1* | 1/2016 | Agardh | H04W 74/0816 370/329 |
| 2016/0095110 A1* | 3/2016 | Li | H04W 72/1215 370/329 |
| 2016/0248555 A1* | 8/2016 | Lei | H04L 5/0005 |
| 2017/0111889 A1* | 4/2017 | Li | H04W 74/08 |
| 2017/0257865 A1* | 9/2017 | Halabian | H04L 27/2607 |

OTHER PUBLICATIONS

Feng, Mei, International Search Report, PCT/IB2016/055181, EPO, Rijswijk, the Netherlands, Mar. 29, 2017.

Federal Communications Commission (FCC), Compliance Measurement Procedures for Unlicensed-National Information Infrastructure Devices Operating in the 5250-5350 MHz and 5470-5725 MHz Bands Incorporating Dynamic Frequency Selection,https://apps.fcc.gov/kdb/GetAttachment.html?id=V2DzGgztnfxjTcht59nQ7Q%3D%3D&desc=905462%20D02%20UNII%20DFS%20Compliance%20Procedures%20New%20Rules%20v02&tracking_number=27155.

Feng, Mei, Examination Report, European Patent Application 16767021.5-1231, based on PCT/IB2016/055181, EPO, Berlin, Germany, dated Mar. 4, 2020.

* cited by examiner

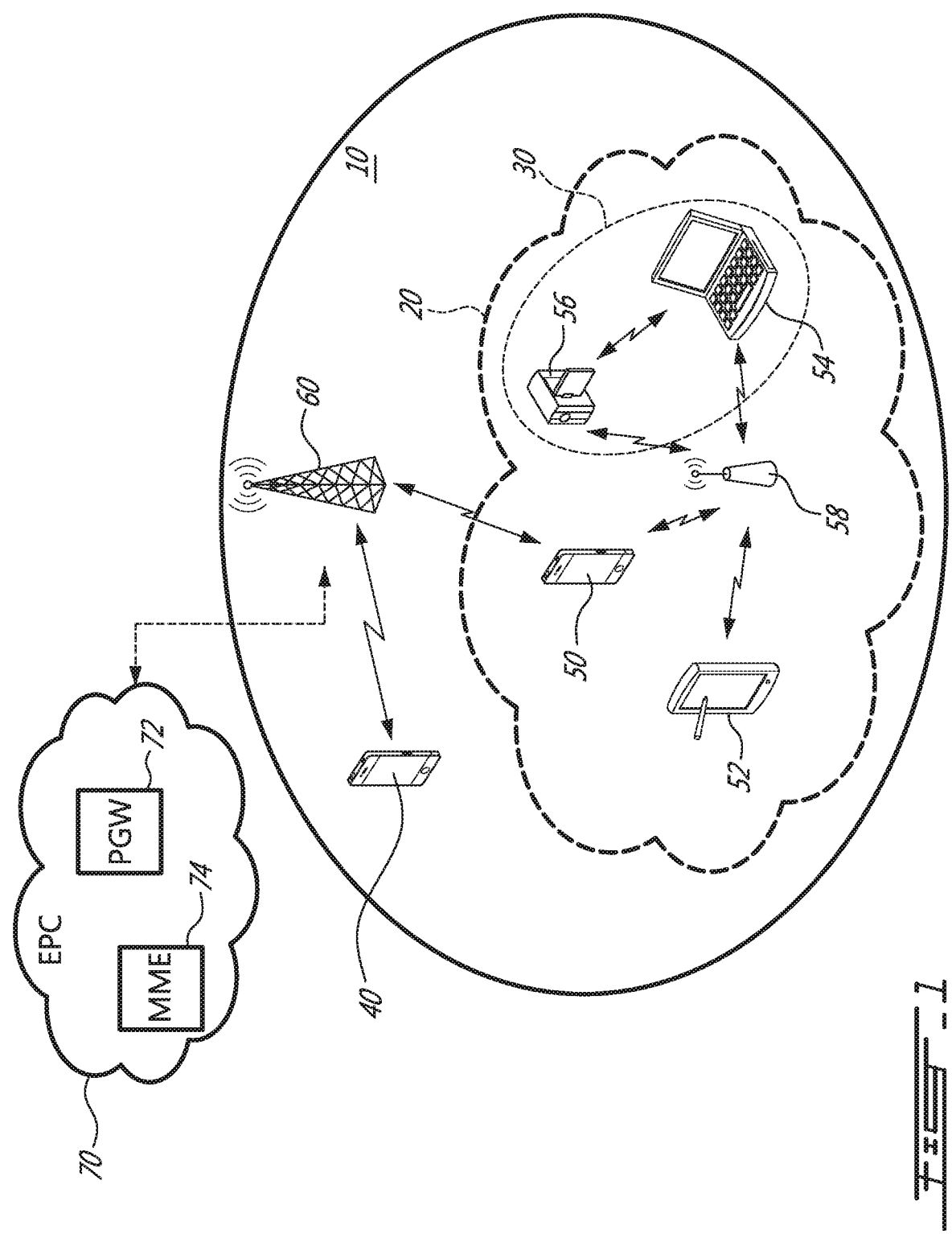

LTE OFDM

Wi-Fi OFDM

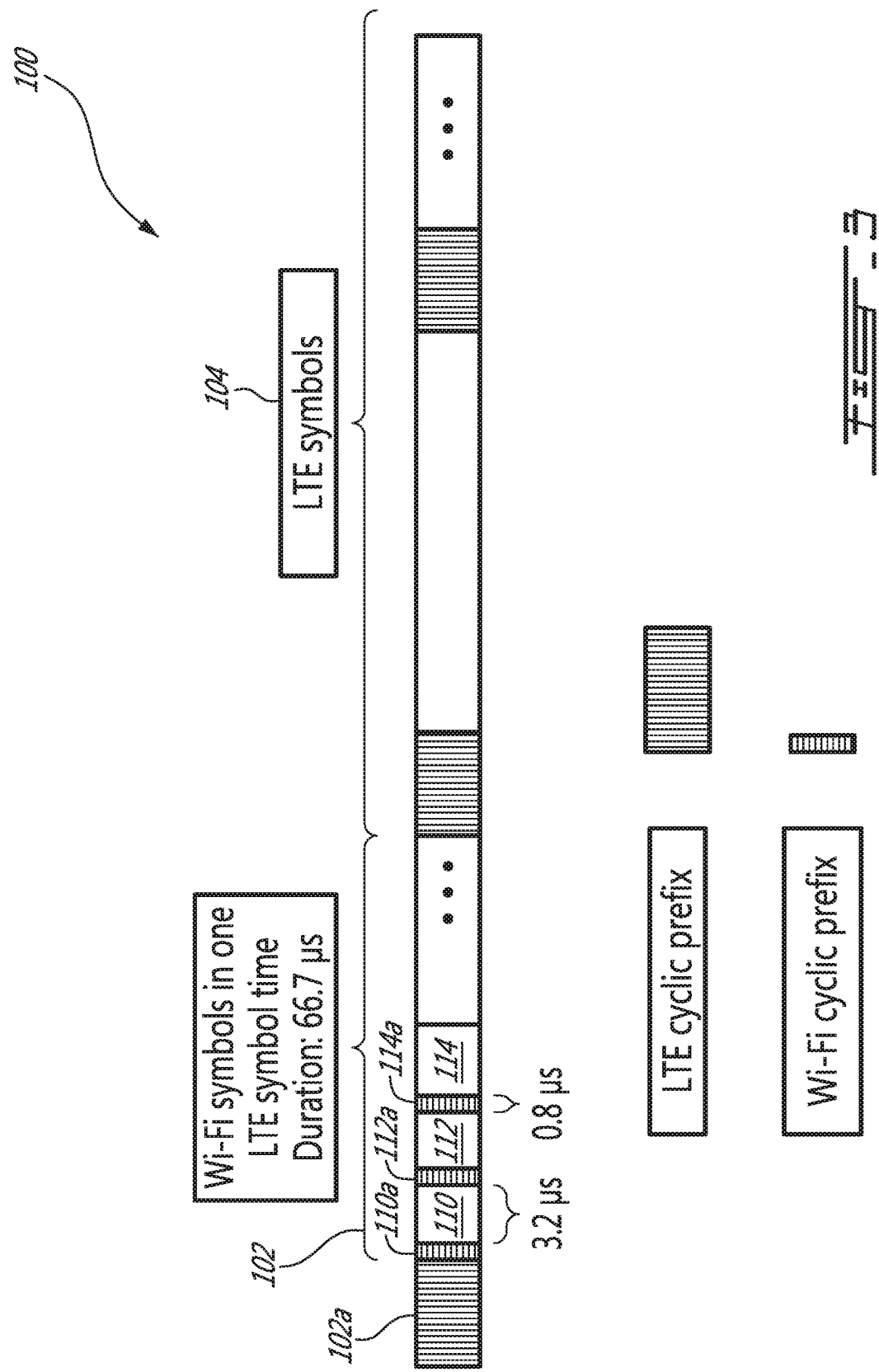

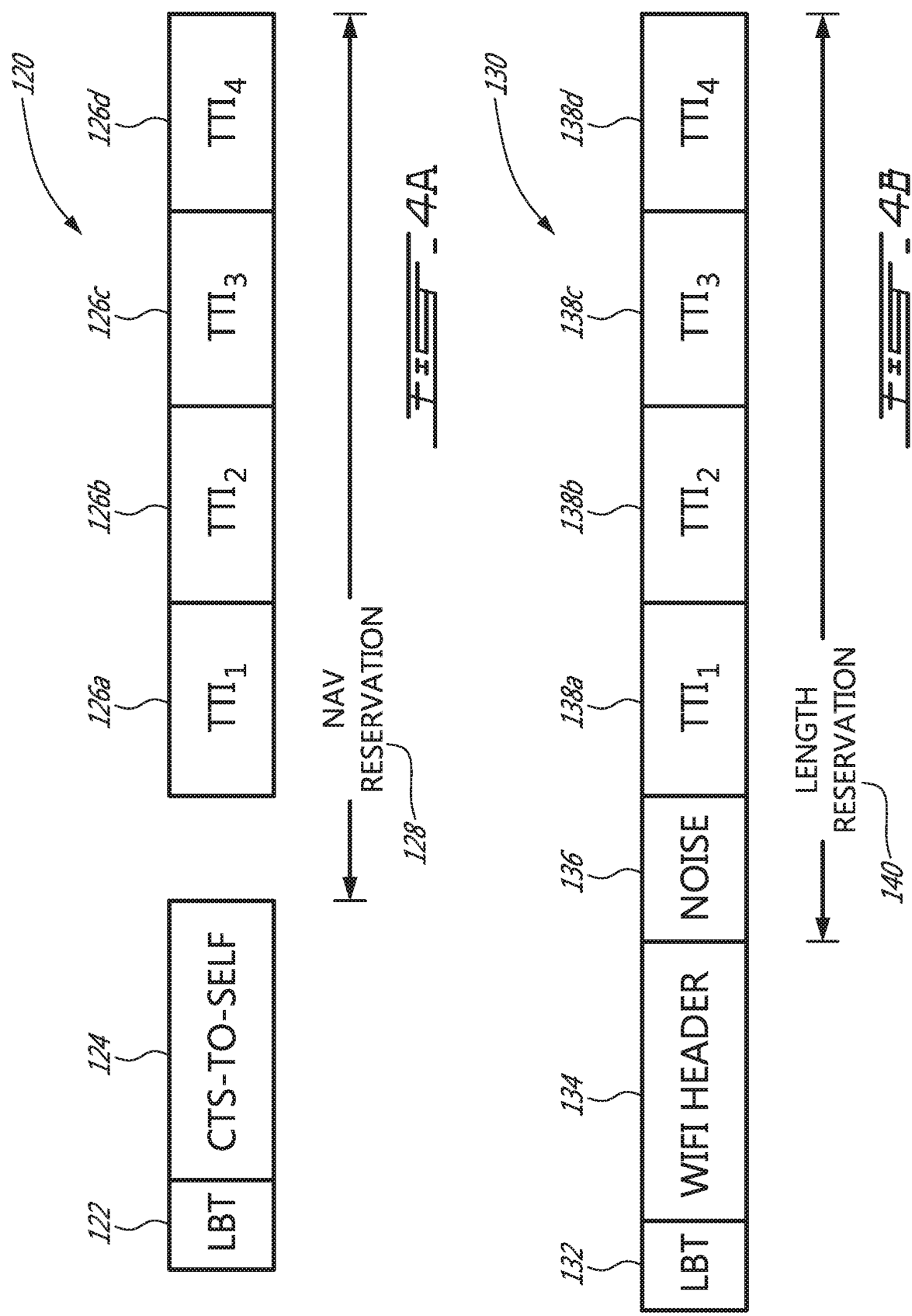

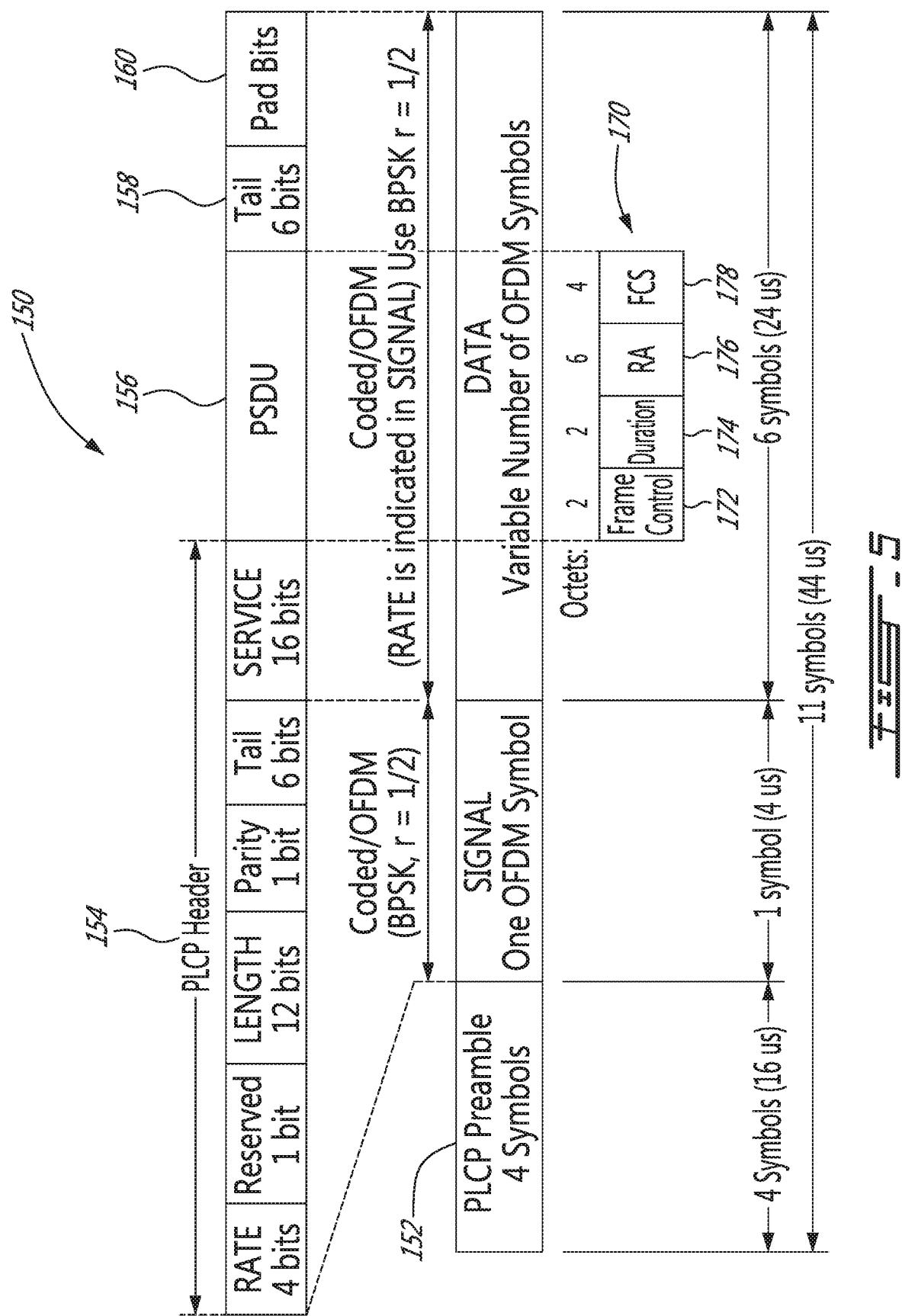

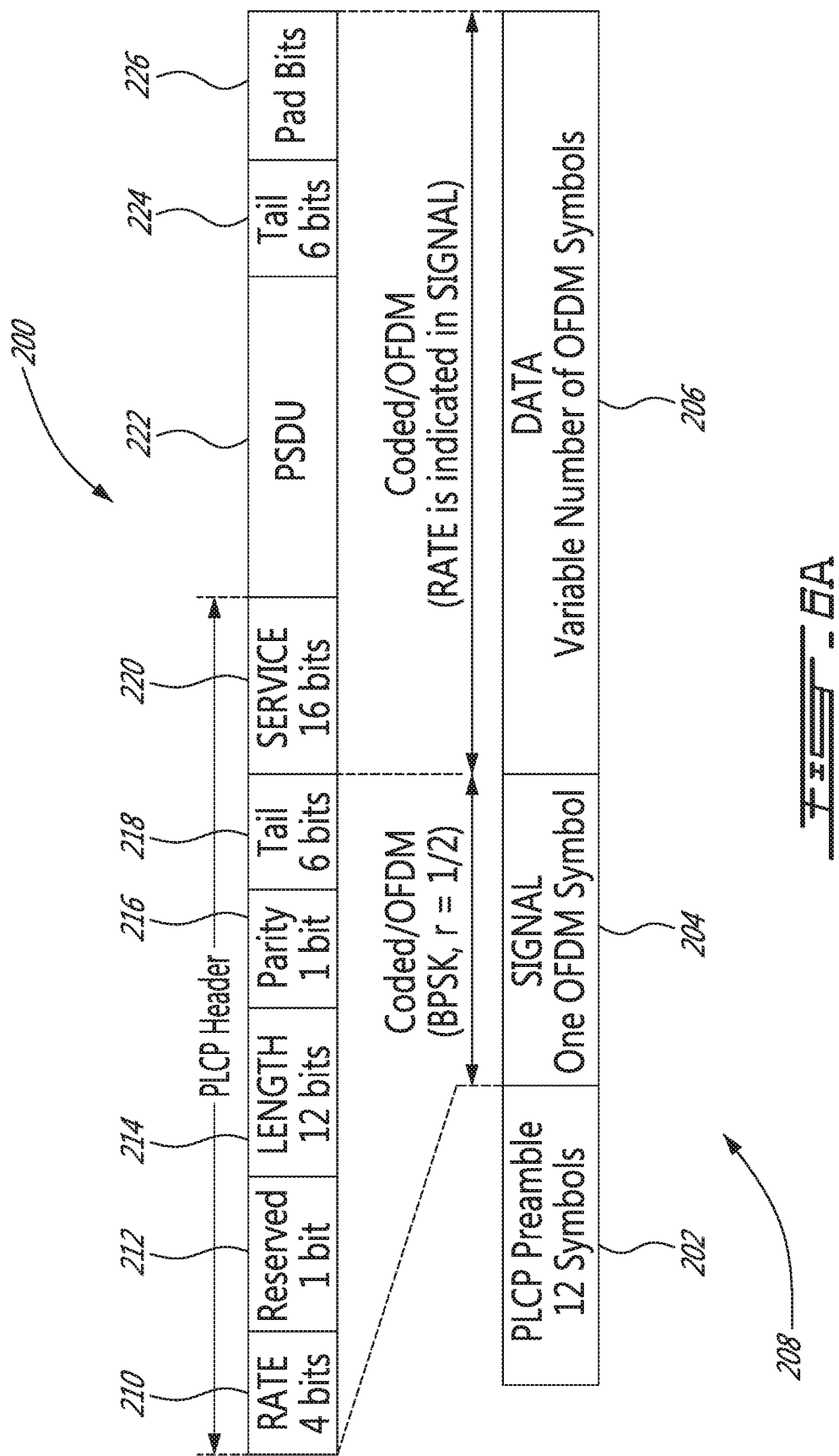

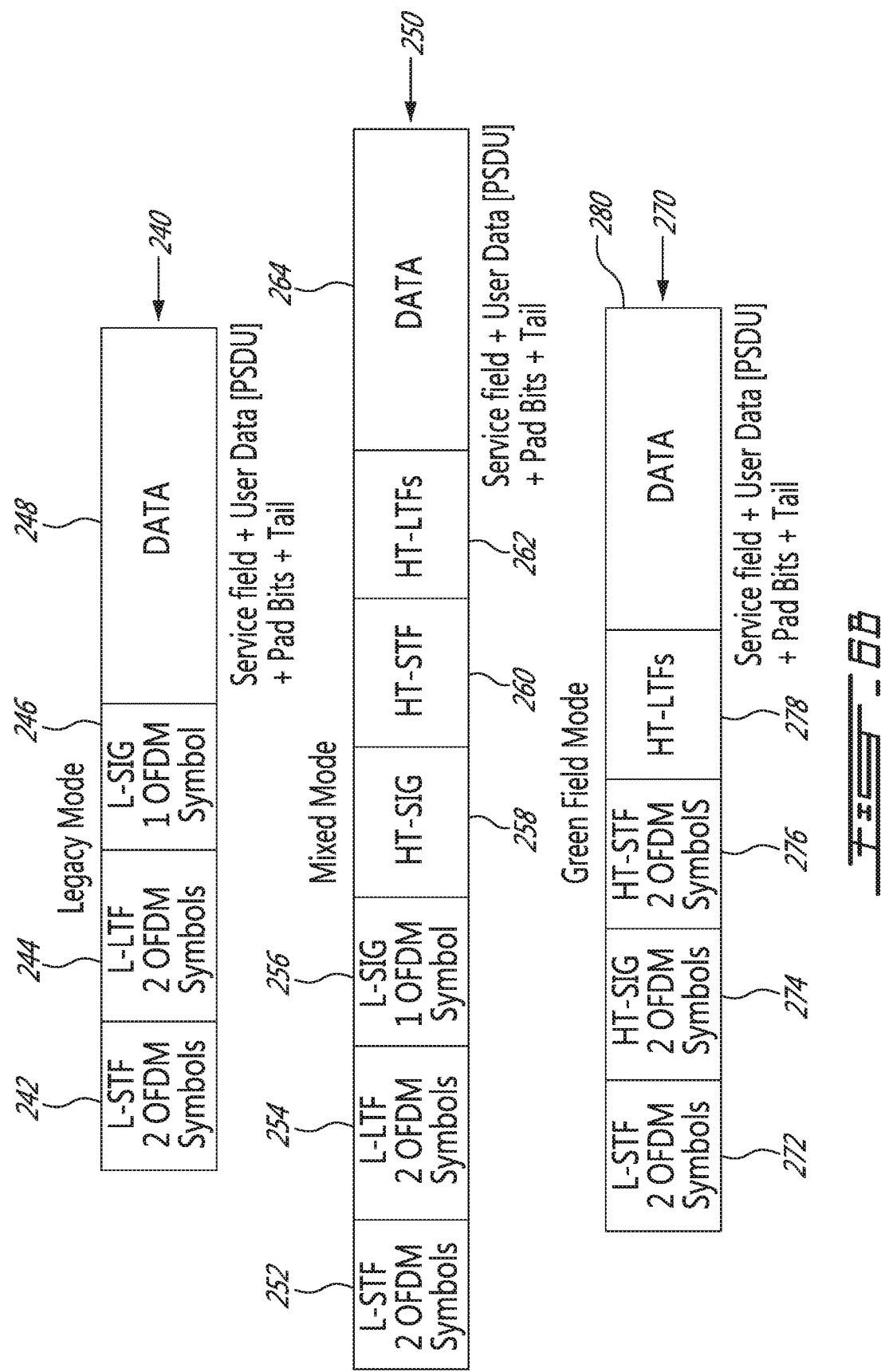

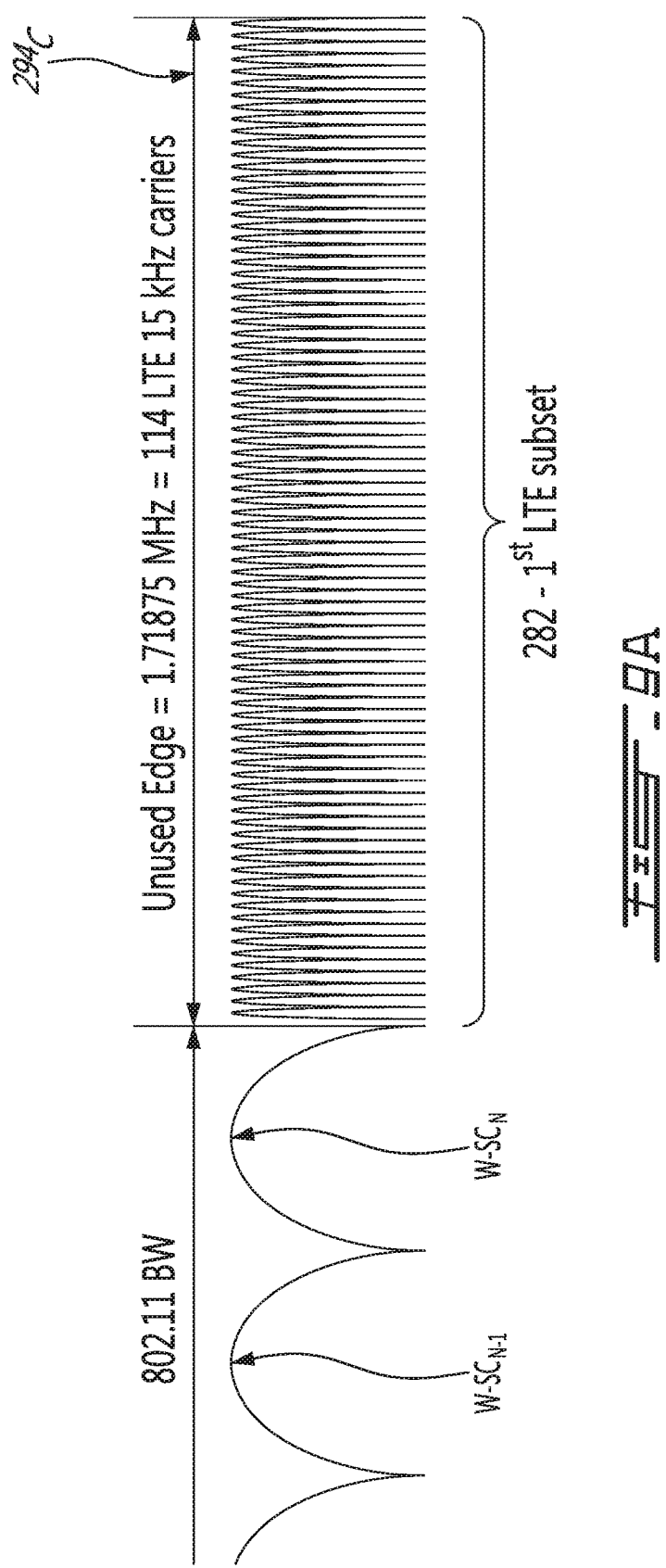

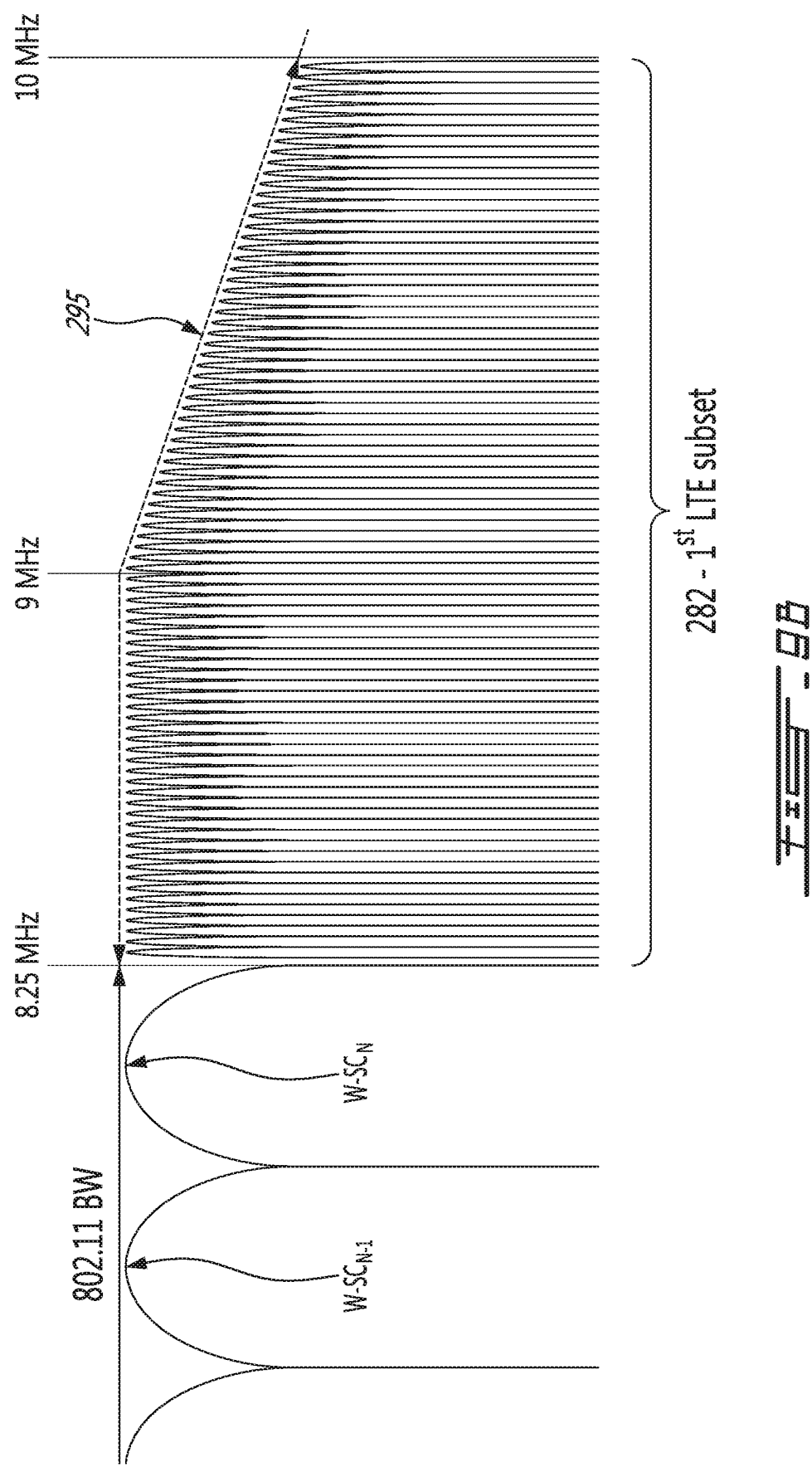

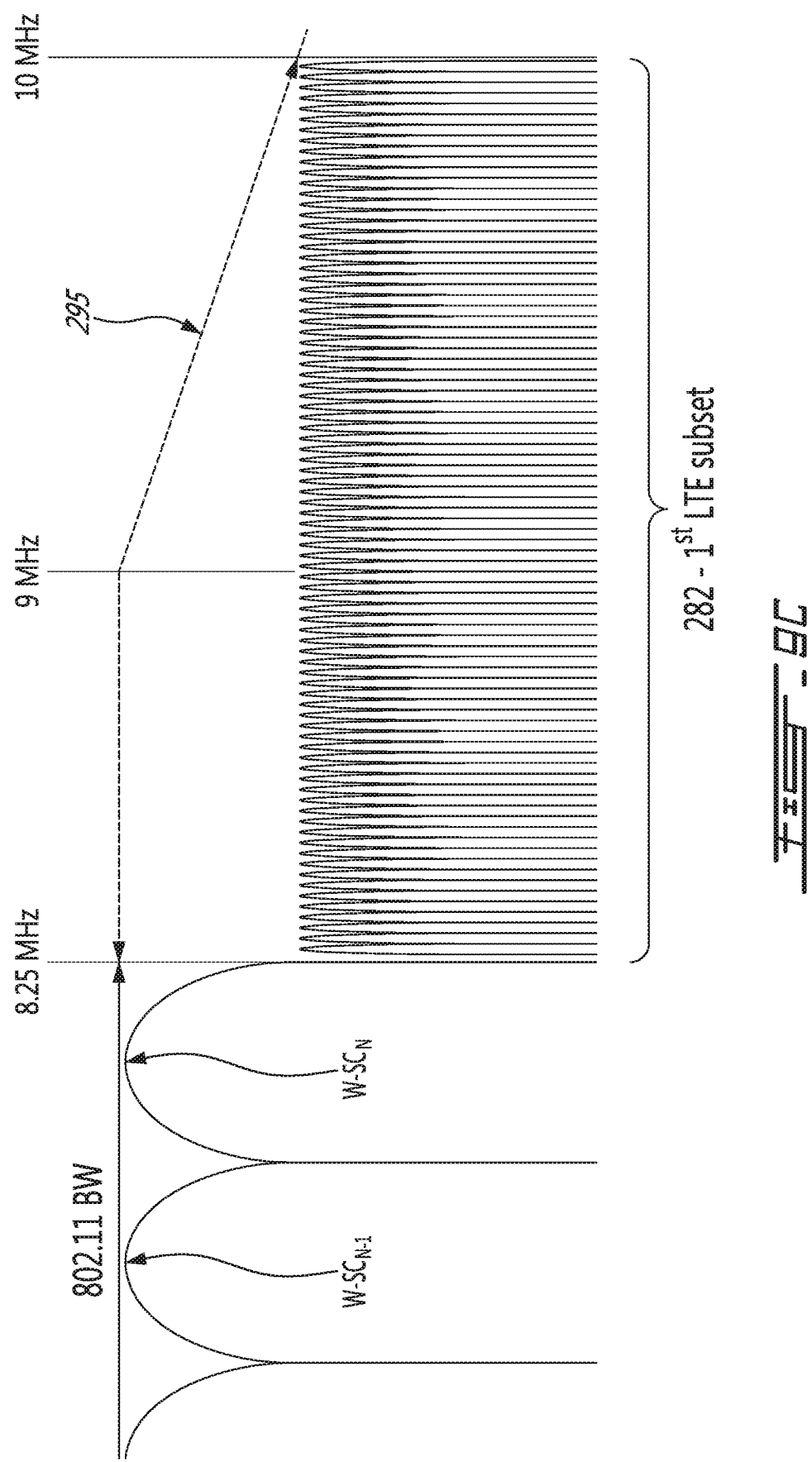

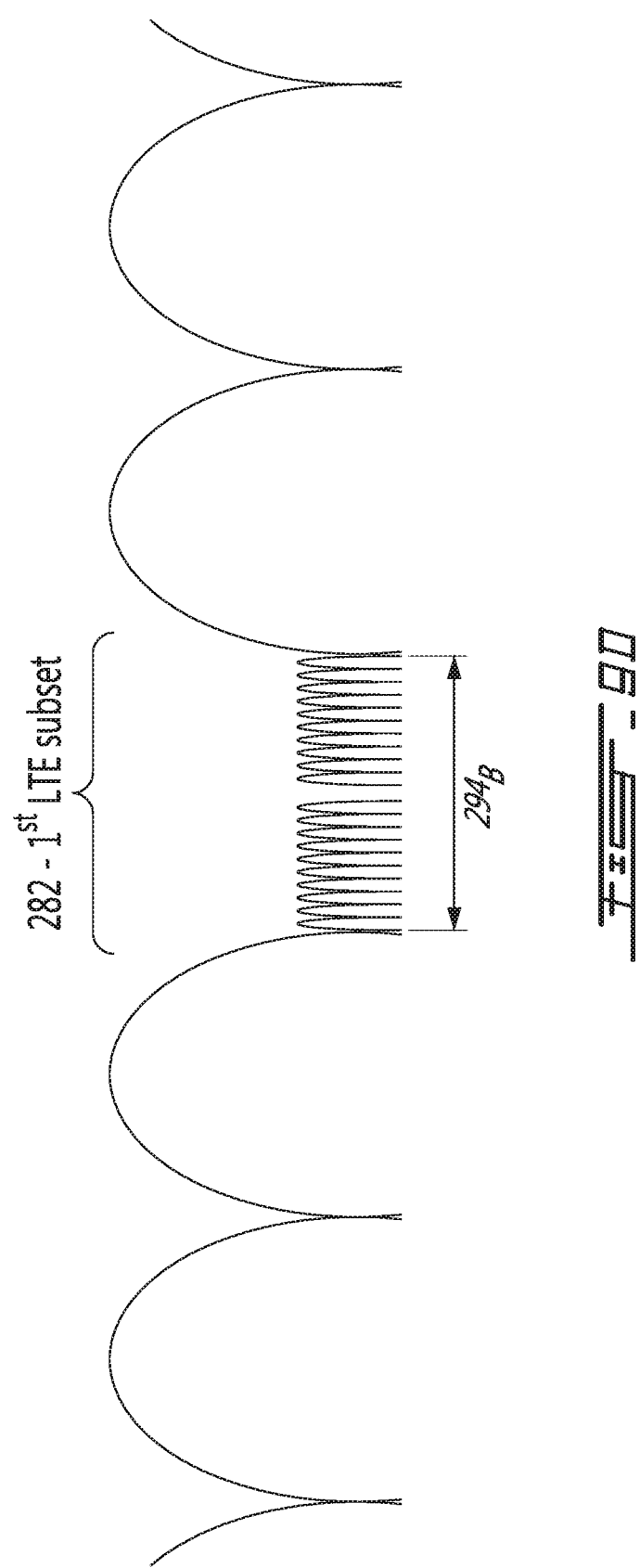

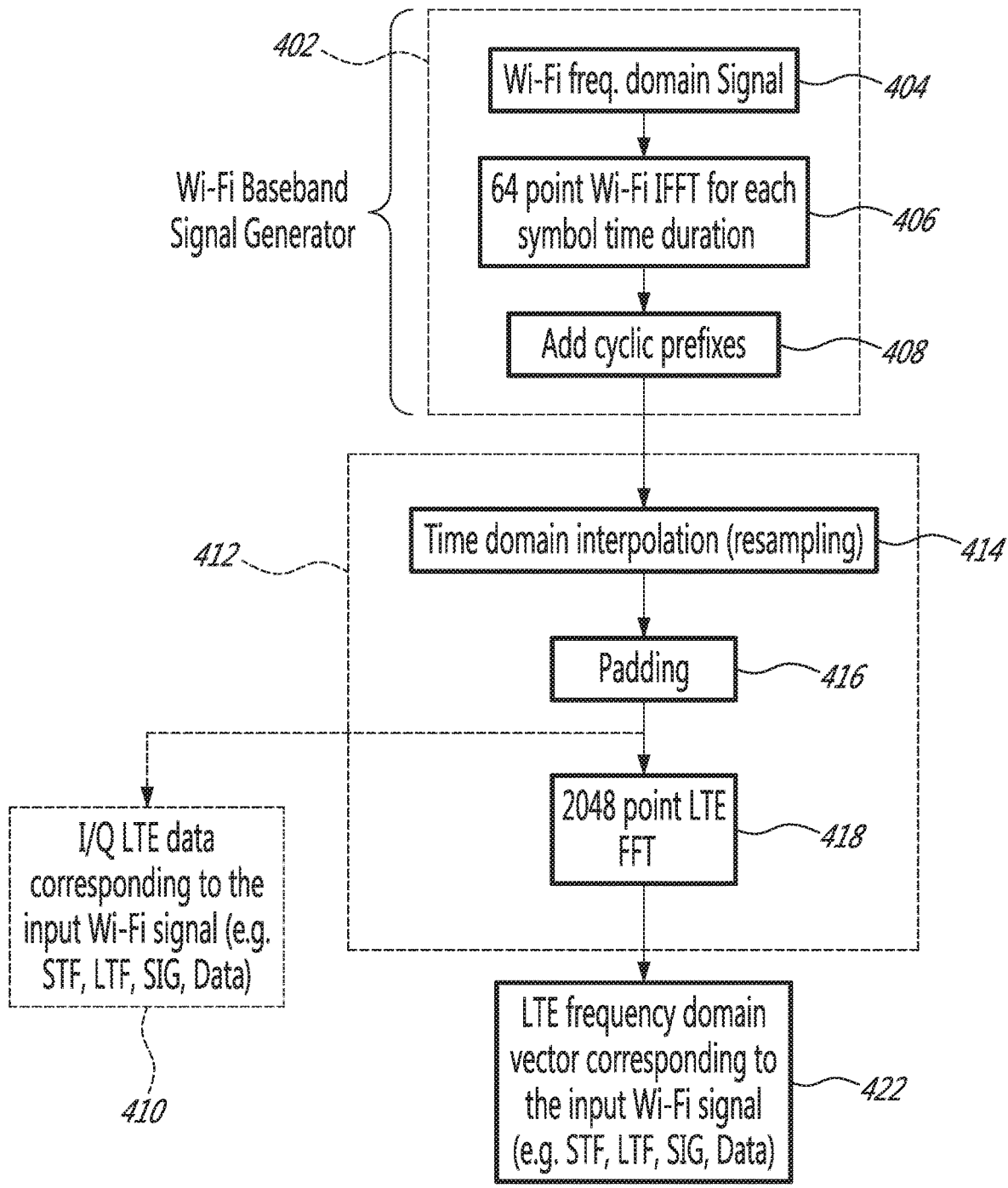

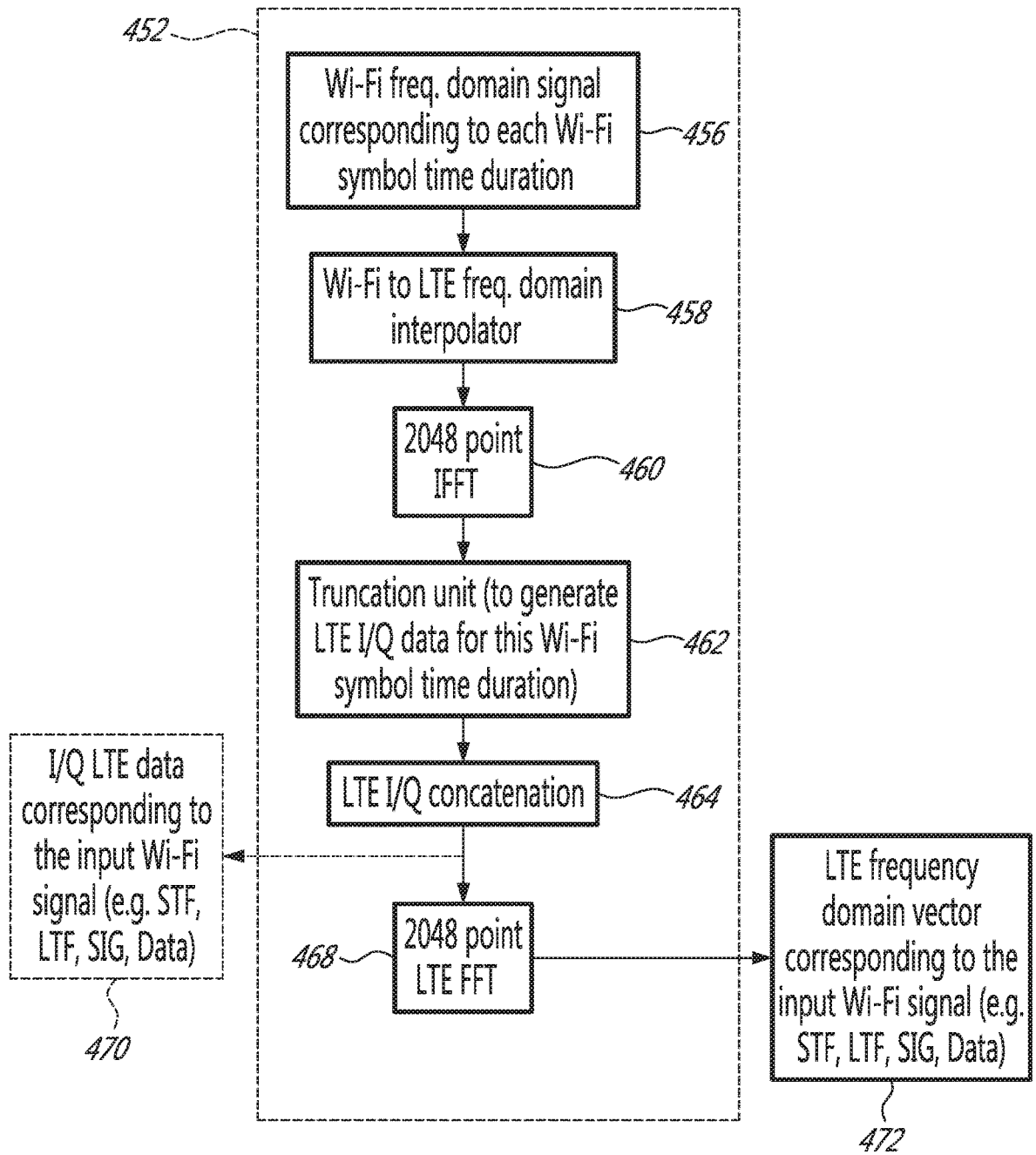

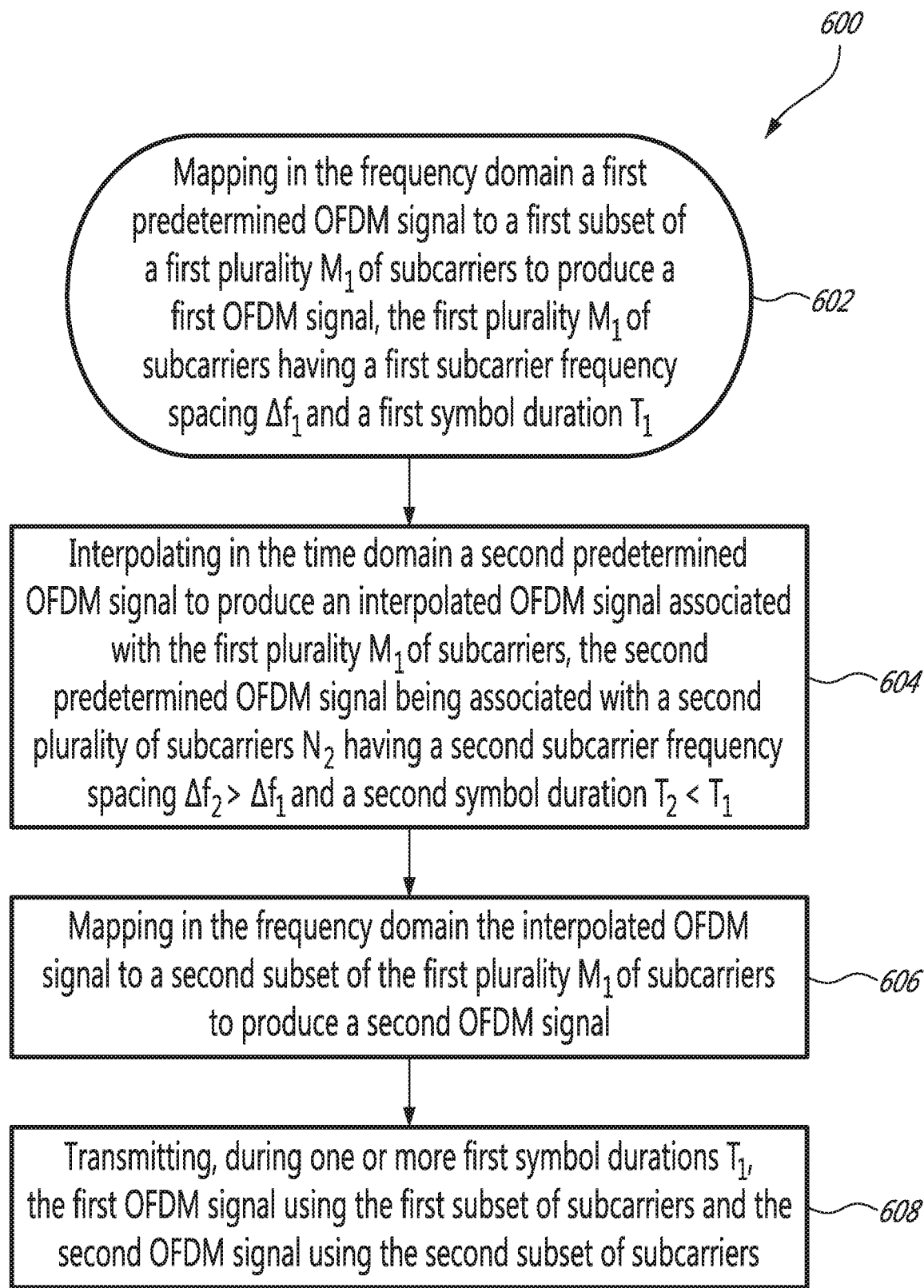

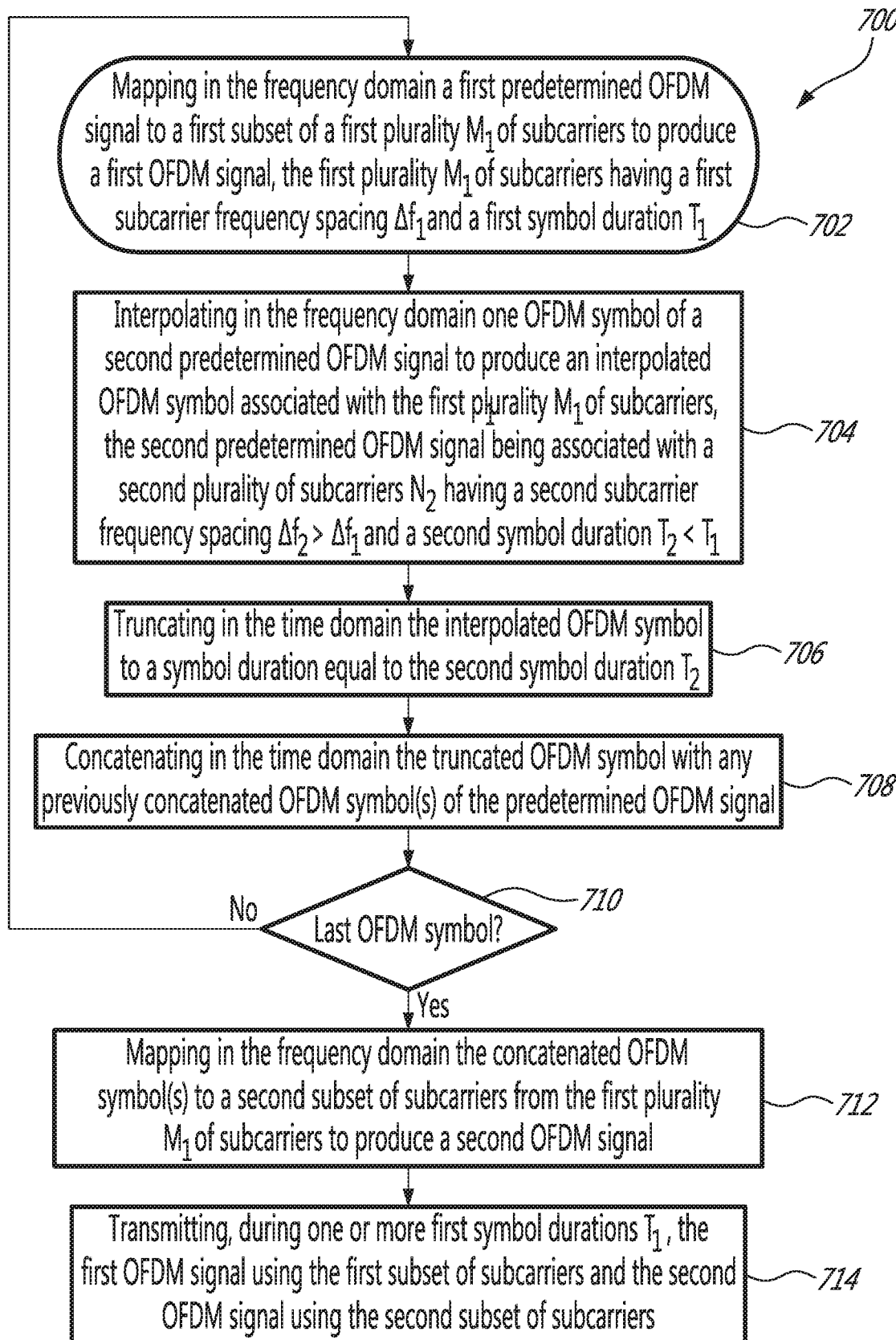

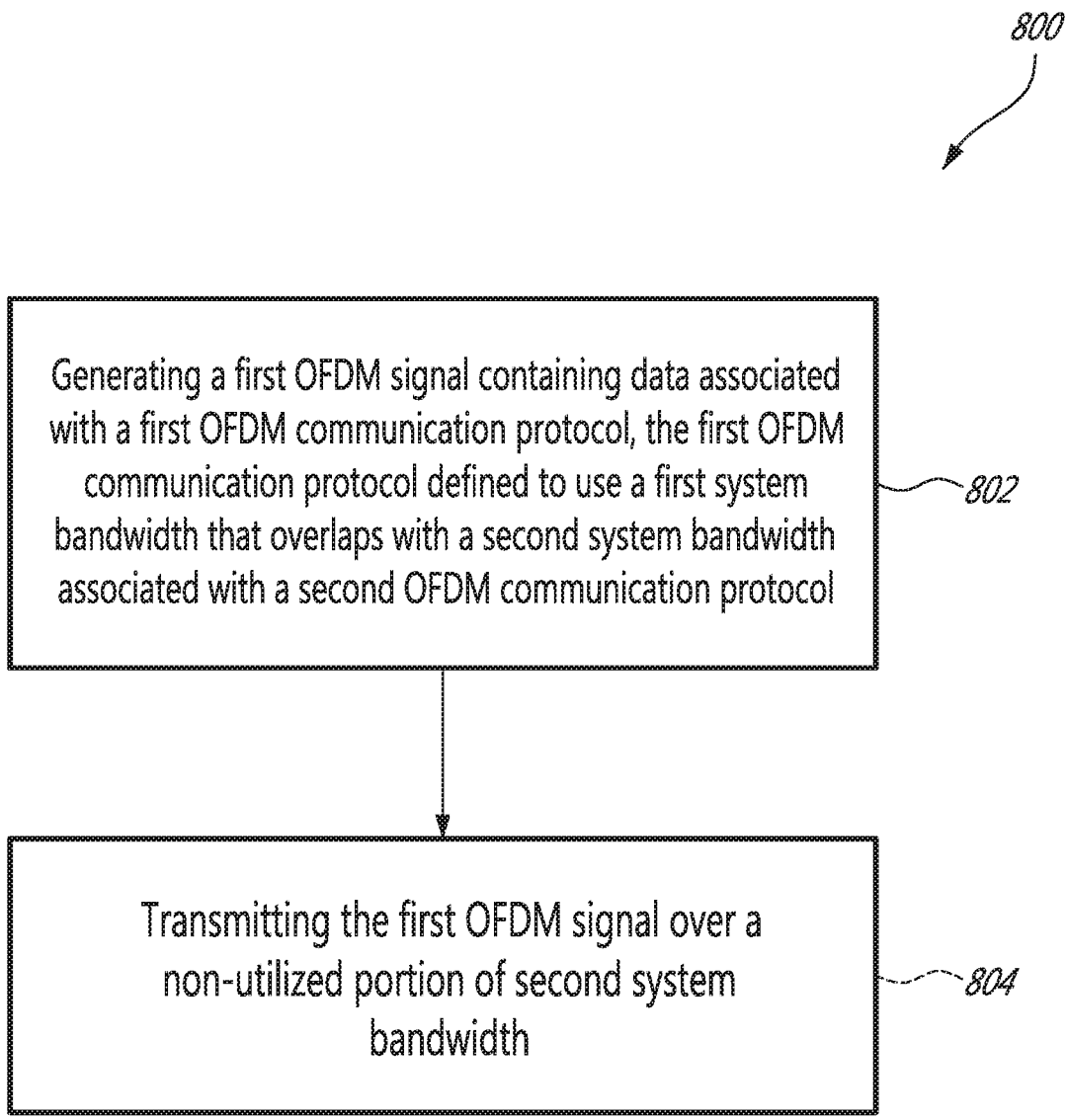

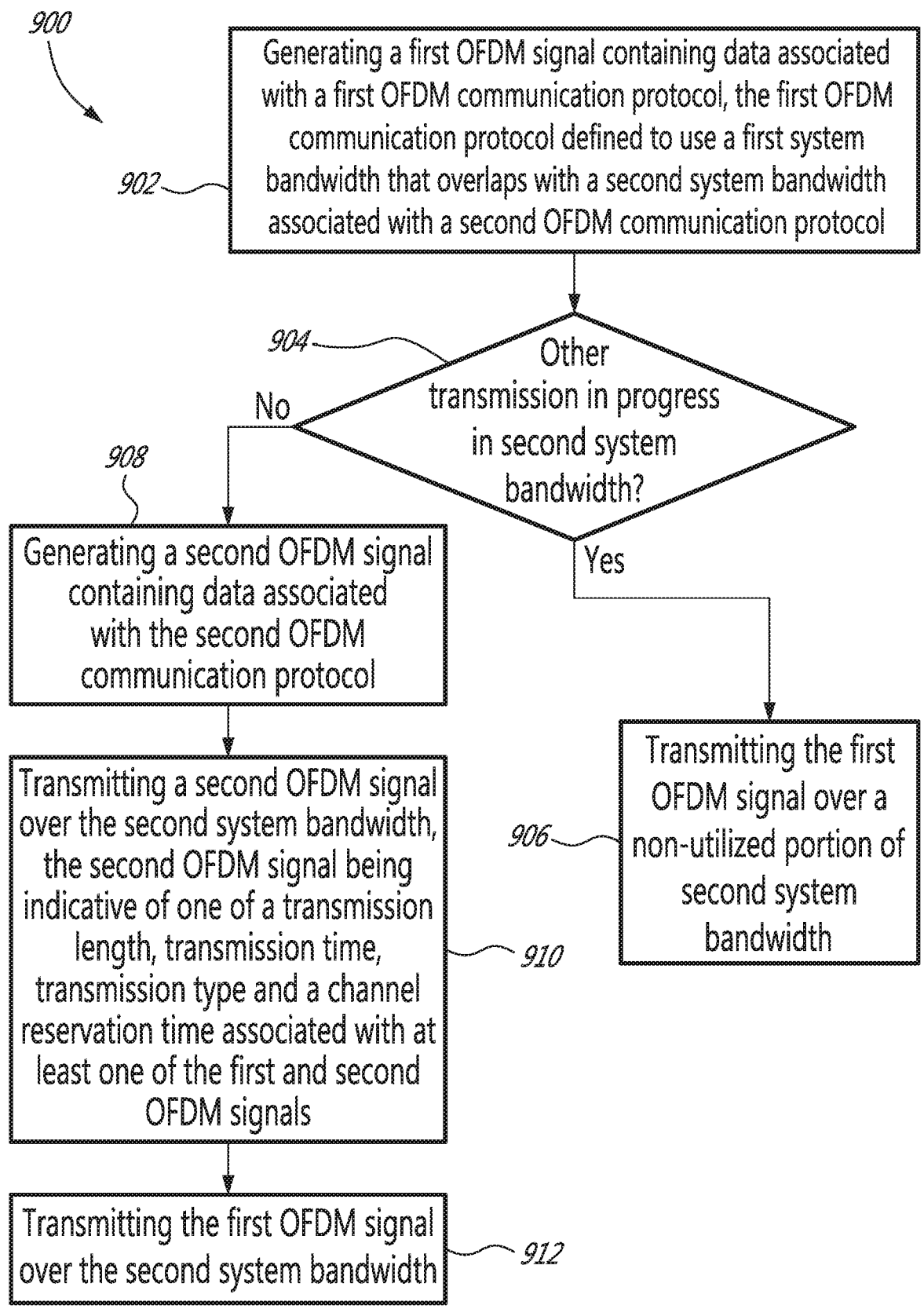

METHOD AND SYSTEM FOR ORTHOGONAL MULTI-PROTOCOL TRANSMISSIONS

RELATED APPLICATIONS

This application is a 35 U.S.C. § 371 national phase filing of International Application No. PCT/IB2016/055181, filed Aug. 30, 2016, which claims the benefit of provisional patent application Ser. No. 62/365,658, filed Jul. 22, 2016, the disclosures of which are hereby incorporated herein by reference in their entireties.

TECHNICAL FIELD

The present disclosure relates to wireless communication systems and in particular a method and system for orthogonal multi-protocol transmissions in wireless communication networks.

BACKGROUND

Orthogonal frequency-division multiplexing (OFDM) has become a key encoding method used by many communications technologies ranging from wireline to wireless technologies. In fact, OFDM use is pervasive, being employed by many technologies including, but not limited to, wired communications such as Digital Subscriber Loop (DSL), Asymmetric DSL (ADSL) and Very-high-bit-rate DSL (VDSL) broadband access technology over Plain Old Telephone Service (POTS) copper wiring, Digital Video Broadcasting (DVB), Power Line Communications (PLC), ITU-T G.hn for home wiring LANs, telephone modems, DOCSIS—Data Over Cable System Interface Specification for broadband delivery, MoCA—Multimedia Over Coax Alliance home networking, and wireless communications including IEEE 802.11 (e.g. Wi-Fi), HIPERLAN, Digital TV, Personal Area Networks (PAN), and Ultra-Wideband (UWB) Networks.

OFDM and its multiple access variant OFDMA continue to find increasing applications, for example in $3^{rd}$ Generation Partnership Project (3GPP)-based wireless networks such as Long Term Evolution (LTE) and Evolved Universal Mobile Telecommunications System Terrestrial Radio Access (E-UTRA) networks, but also in IEEE-based networks such as Mobile Broadband Wireless Access (MBWA, also referred to as IEEE 802.20). Next Generation mobile networks are planning to use OFDM as the platform for this new and exciting product evolution, and even the Wireless Gigabit Alliance (WiGig) plans to use OFDM in the 60 GHz frequency band to enable conference room cell sizes to achieve 100 Gigabits per second (Gbps) data rates.

Although these technologies are all based on OFDM, they have significant differences in their technology implementations. OFDM is a digital modulation technique that uses frequency division multiplexing to create multiple orthogonal sub-carriers to carry parallel data streams. Sub-carriers are modulated using conventional modulation schemes such as Binary Phase Shift Keying (BPSK) or Quadrature Amplitude Modulation (QAM) with defined symbol rates enabling multiple parallel data streams to be carried.

The detailed implementations for these various technologies are all quite different, largely driven by channel limitations or restrictions, and desired operational features. For example, 802.11a Wi-Fi employs short 3.2 microsecond (µs) symbols (with 0.4 or 0.8 µs for the cyclic prefix), and 52 carriers spaced at 312.5 kHz to create a high speed data channel capable of withstanding the low dispersion experienced in short reach indoor channels which Wi-Fi APs typically address, while LTE typically employs longer 66.7 µs symbols (or 71.4 µs with the cyclic prefix) with 15 kHz spaced subcarriers to address significant inter-symbol interference issues typical of long reach outdoor cellular channels.

Implementations differ by symbol time and sub-carrier spacing, but also by many other physical layer parameters including the number of sub-carriers, channel spacing, Fast Fourier Transform (FFT) size, number and operation of pilot tones, convolutional codes employed, Forward Error Correction (FEC) design, sub-carrier modulation schemes, time-interleaving, equalizer operation, and Multiple-Input Multiple-Output (MIMO) operation to name a few. Moreover, with the Medium Access Control (MAC) layer defining how the OFDM based physical medium is used by higher layer applications, OFDM designs are inherently complex and specific to a particular OFDM technology. As a result, the implementation of interworking functions with other OFDM based technologies has proven to be very difficult.

Nevertheless, with the explosion of wireless technologies in unlicensed spectrum such as the Unlicensed National Information Interchange (U-NII) bands managed by the Federal Communications Commission (FCC) in the United States, there is a desire to see upcoming technologies such as LTE work together to share this spectrum fairly with incumbents such as 802.11 (e.g. Wi-Fi) the dominant technology, and provide a positive end user experience. 3GPP and some to come 5G licensed networks will shortly begin trials to offer services in unlicensed bands. License Assisted Access for Long Term Evolution (LAA-LTE or LAA), as the first example, has recently demonstrated cabled operation at Mobile World Congress in March of 2015 using the 5 GHz band. Product rollouts are planned in 2016 and 2017. However, concerns over interoperability of these different technologies have been raised, driven by expectations of wide scale deployment of LTE radios into the unlicensed bands.

Since the FCC first made available spectrum in the 5 GHz band for U-NII operation in 1997, an etiquette protocol for medium access was developed for Wi-Fi systems which can be generalized into three rules:
1. Listen Before Talk (LBT)—Do not use the channel if Radio Frequency (RF) energy above a threshold (e.g. −62 dBm) is detected,
2. Carrier Sense—Do not use the channel if a Wi-Fi preamble (or related pilot tones) is detected, and
3. Virtual Carrier Sense—Do not use the channel while a channel busy timer (e.g. the Network Allocation Vector (NAV)) is counting down to zero.

In Wi-Fi systems, the Clear Channel Assessment (CCA) function employs these simple etiquette rules to ensure that many Wi-Fi devices can share the same unlicensed channel fairly, and avoid transmission collisions which may have deleterious effects to both the interferer and interferee.

With the introduction of new 3GPP-based cellular technologies such as LTE and soon to be 5G into the unlicensed bands, an expanded etiquette will be required. Wi-Fi, as the main incumbent technology, has a defined etiquette. However, Wi-Fi does not address the complexities and requirements of 3GPP systems. Although they both use OFDM and both support a number of common features at the physical layer, 3GPP and Wi-Fi are fundamentally different.

One of the most fundamental differences is synchronization. Wi-Fi operates asynchronously by applying the etiquette rules and sending/receiving packets when the medium is free. In contrast, 3GPP operates synchronously and employs advanced scheduling algorithms to maximize channel utilization, and therefore is not burdened with etiquette rules. As a result, 3GPP is able to carry higher traffic loads efficiently i.e. in a way that maximizes the use of the valuable frequency channel resources.

Because of this and other notable differences in OFDM implementation, 3GPP-based technologies are not currently designed to support a sharing etiquette, such as that which Wi-Fi supports.

Different possible solutions have been proposed so far claiming to have the potential for improving fair sharing. One such proposal includes implementing a power-based LBT detect threshold. With this proposal, the LTE radio would monitor energy on the channel and consider it free if the received signal strength indication (e.g. RSSI) is lower than that threshold. However, this proposal does not address the variability of cell sizes due to unlicensed band interference. Also, in some implementations, the threshold is fairly large (−62 dBm) and limits the cell size. Depending on the channel conditions, there is no guarantee that the LTE radio will detect a transmitted signal above the threshold and this ultimately may result in a higher collision count and lower throughput.

Accordingly, to address some or all of the drawbacks noted above, there is a need for improved method and systems to facilitate co-existence in shared spectrum.

SUMMARY

Methods and systems for multi-protocol transmissions in shared spectrum are disclosed. According to principles described herein, an OFDM transmitter is configured to generate transmissions associated with one OFDM technology or protocol (OFDM2) using subcarriers of another OFDM technology (OFDM1).

Generally, multi-protocol transmissions as described herein may be performed sequentially (e.g. in a time division multiplexing fashion) or concurrently (e.g. during the same or an overlapping time interval). For concurrent transmissions, an OFDM1 transmitter may be configured to map or assign the different OFDM signals to different subsets of the available OFDM1 subcarriers such that the data contained therein can be transmitted at the same or during an overlapping time.

In one application, an OFDM1 transmitter may be configured to assign different subsets of the OFDM1 subcarriers to simultaneously or concurrently transmit OFDM1 and OFDM2 information. In one example, an LTE transmitter uses a first subset of LTE subcarriers to generate and transmit an LTE signal that can be understood by LTE receivers, for example, a Discovery Reference Signal (DRS) for License Assisted Access for Long Term Evolution (LAA-LTE or LAA). Concurrently, the LTE transmitter uses a second, different subset of LTE subcarriers to generate and transmit another LTE signal carrying 802.11 (e.g. Wi-Fi) information that can be understood by Wi-Fi receivers, for example, to reserve the channel for a certain duration, to indicate a transmission time associated with an on-going and/or upcoming LTE transmission or to create a carrier sense indication, for example, to cause Wi-Fi receivers and other radio technologies to consider the channel as busy.

In another application, in addition to or as an alternative to transmitting OFDM2 information using OFDM1 subcarriers, an OFDM1 transmitter may, in other implementations, use OFDM1 subcarriers which are located in unused portions of the OFDM2 system bandwidth, and hence orthogonal to subcarriers in the used portion in the OFDM2 system bandwidth. For example, an LTE transmitter can be configured to generate and/or transmit LTE information using LTE subcarriers located in unused portion(s) of the Wi-Fi system bandwidth independently of or in addition to transmitting Wi-Fi or LTE information using LTE subcarriers located in portions of the Wi-Fi system bandwidth normally used or occupied by Wi-Fi subcarriers. In some implementations, by using LTE subcarriers in non-utilized portion(s) of the Wi-Fi system bandwidth, an LTE transmitter operating in the same or an overlapping system bandwidth can advantageously generate and transmit additional LTE data using subcarriers orthogonal to those normally used in the underlying Wi-Fi channel. In other implementations, if the Wi-Fi channel is busy, the LTE transmitter can limit its LTE transmissions to only use the LTE subcarriers in non-utilized portion(s) of the Wi-Fi system bandwidth. Alternatively, or additionally, if the Wi-Fi channel is idle, the LTE transmitter can be configured to transmit LTE and Wi-Fi signals concurrently (by partitioning the LTE available subcarriers into subsets) or in sequence (e.g. by using the LTE subcarriers to generate and/or transmit a Wi-Fi signal to reserve the channel for a subsequent LTE transmission).

The embodiments described are primarily in relation to the generation and transmission of Wi-Fi and LTE information using LTE subcarriers. However, the same approach is equally applicable to other OFDM technologies such as for example 802.15 technologies (e.g. ZigBee). Generally, the principles described herein are applicable to any implementation where subcarriers or symbol information from one OFDM technology are used to transmit subcarrier or symbol information using subcarriers of another OFDM technology. In some embodiments, the principles described herein are applicable to generate any possible signal to the extent allowed by the spectral bandwidth available to the OFDM transmitter. In addition, the principles are equally applicable to other non-OFDM technologies or to generate non-OFDM signals. For example, the principles described herein may be employed to generate IEEE 802.11b CCK signals, using subcarriers or symbol information from one OFDM technology. The principles described within may even be applied to signal generation for applications yet undetermined, a possible example being in-building "radar", using specialized signals to detect and characterize in-building objects for the purpose of high precision location tracking.

In one broad aspect, there is provided a method for an OFDM transmitter or transmitting node configured for OFDM signal transmissions. The method includes generating a first OFDM signal containing data associated with a first OFDM communication protocol, where the first OFDM communication protocol is defined to use a first system bandwidth that overlaps with a second system bandwidth associated with a second OFDM communication protocol. The method further includes transmitting the first OFDM signal over a non-utilized portion of the second system bandwidth.

In one implementation, the first OFDM signal is transmitted using a first subset of a first plurality of subcarriers having a first subcarrier frequency spacing, where the first subset is located in the non-utilized portion of the second system bandwidth. In another implementation, the method further includes generating a second OFDM signal containing data associated with the second OFDM communication protocol, and transmitting the second OFDM signal over the second system bandwidth.

In yet another implementation, the first and second OFDM signals are transmitted at a same or a different time.

In yet another implementation, transmitting the first OFDM signal includes transmitting the first OFDM signal over the non-utilized portion of the second system bandwidth if another transmission is in progress in the second system bandwidth. In yet another implementation, if no other transmission is in progress in the second system bandwidth, the method further includes, prior to transmitting the first OFDM signal, transmitting the second OFDM signal over the second system bandwidth, where the second OFDM signal is indicative of one of a transmission length, transmission time, transmission type and a channel reservation time associated with at least one of the first and second OFDM signals, and where the first OFDM signal is subsequently transmitted over the second system bandwidth. In yet another implementation, the second OFDM signal is transmitted using a second plurality of subcarriers having a second subcarrier frequency spacing different than the first subcarrier frequency spacing, where the second plurality of subcarriers is located in a utilized portion of the second system bandwidth. In yet another implementation, the second OFDM signal is transmitted using a second subset of subcarriers from the first plurality of subcarriers, different from the first subset, where the second subset being located in the utilized portion of the second system bandwidth.

In yet another implementation, the first and second OFDM signals are generated in one of a time domain and a frequency domain, based on respective first and second predetermined OFDM signals containing data associated with the first and second OFDM communication protocols. In yet another implementation, generating the first OFDM signal includes mapping the first predetermined OFDM signal to subcarriers in at least the first subset and where generating the second OFDM signal includes mapping the second predetermined OFDM signal to subcarriers in at least the second subset. In yet another implementation, the second subset includes at least one subcarrier overlapping in frequency with a subcarrier of the second plurality of subcarriers.

In yet another implementation, generating the second OFDM signal further includes generating the second predetermined OFDM signal, and interpolating the second predetermined OFDM signal generated using the first plurality of subcarriers to produce an interpolated OFDM signal that can be mapped to subcarriers in the second subset.

In yet another implementation, the first OFDM communication protocol includes an LTE protocol and the second OFDM communication protocol includes an 802.11 protocol. In yet another implementation, the first OFDM signal includes an LTE signal and the second OFDM signal includes one of a Clear To Send (CTS) frame, a Short Training Field (STF), a Long Training Field (LTF), and a Signal Field (SIG). In yet another implementation, the first OFDM signal is transmitted at a power level different than a power level for the second OFDM signal.

In another broad aspect, there is provided an OFDM transmitter or transmitting node configured for OFDM signal transmissions. The OFDM transmitter includes circuitry containing instructions which, when executed, are configured to cause the transmitter to perform any of the method embodiments described above.

In yet another broad aspect, there is provided a non-transitory computer readable memory configured to store executable instructions for an OFDM transmitter or transmitting node configured for OFDM signal transmissions. The executable instructions when executed by a processor are configured to cause the OFDM transmitter to perform any of the method embodiments described above.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIG. 1 illustrates one example of a Long Term Evolution (LTE) Radio Access Network (RAN) and Wireless Local Area Networks (WLANs) configured to share unlicensed spectrum resources, in accordance with the principles described herein;

FIG. 3 illustrates a timing diagram showing an example of Wi-Fi symbols transmitted by an LTE node in the LTE RAN of FIG. 1, in accordance with the principles described herein;

FIGS. 4A-B illustrate timing diagram examples of Wi-Fi transmissions by an LTE node in the LTE RAN of FIG. 1 for channel reservation in an unlicensed band in accordance with the principles described herein;

FIG. 5 illustrates a format example for the CTS-To-Self packet of FIG. 4A in accordance with the principles described herein;

FIGS. 6A-B illustrate format examples for the Wi-Fi header transmission shown in FIG. 4B in accordance with the principles described herein;

FIGS. 9A-D illustrate frequency diagram examples of LTE subcarriers located in non-utilized portions of the Wi-Fi 20 MHz channel system bandwidth which can be used to generate and/or transmit LTE signals;

FIG. 11 illustrates a block diagram example for the signal generator and time-domain interpolator of the OFDM transmitter shown in FIG. 10A, configured in accordance with the principles described herein;

FIG. 12 illustrates a block diagram example for the frequency-domain interpolator of the OFDM transmitter shown in FIG. 10B, configured in accordance with the principles described herein;

FIGS. 13A-B show a flow chart of example methods for the OFDM transmitters of FIGS. 10A-B in accordance with the principles described herein;

FIGS. 14A-B show a flow chart of other example methods for the OFDM transmitters of FIGS. 10A-B in accordance with the principles described herein;

DETAILED DESCRIPTION

Figure 2A:
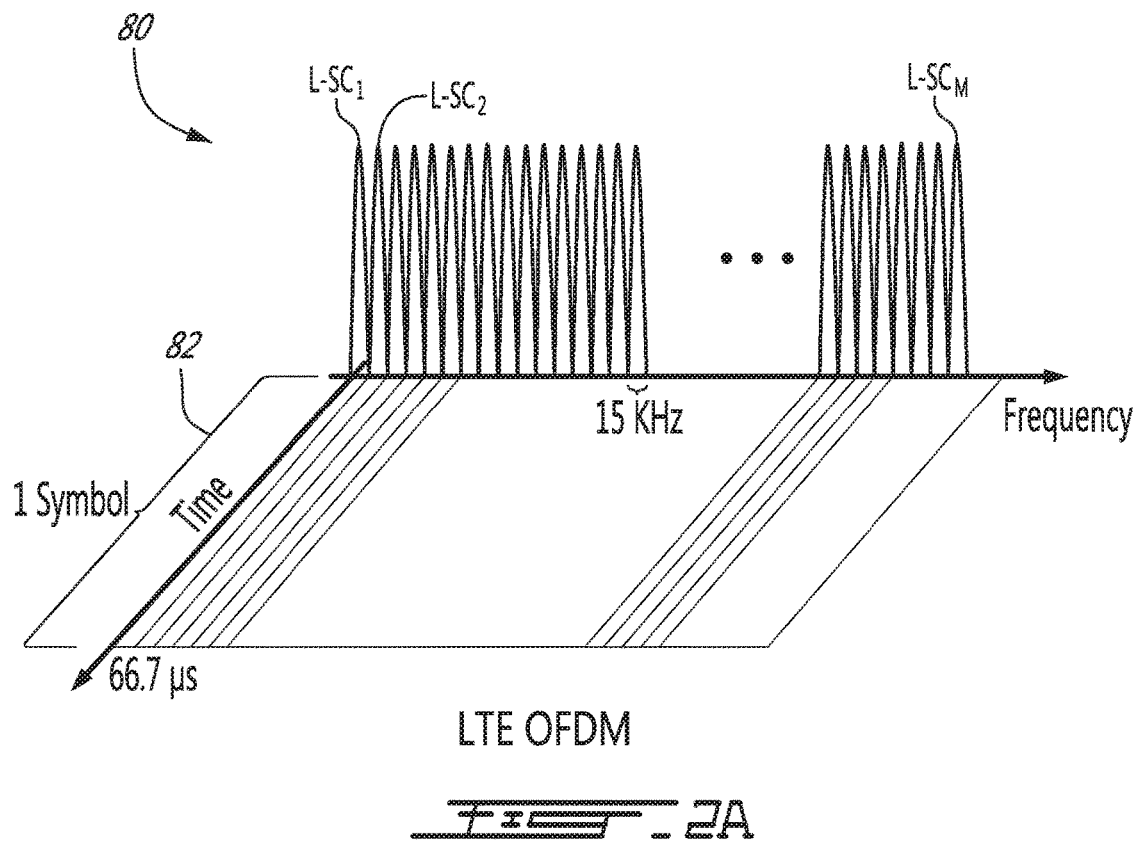
FIGS. 2A-B illustrate an example of LTE subcarriers and Wi-Fi subcarriers used in the LTE RAN and WLANs of FIG. 1, in accordance with the principles described herein.

The present disclosure is directed to methods and systems for multi-protocol transmissions in shared spectrum e.g. unlicensed bands or band normally used for unlicensed access. The principles described herein are applicable to generating subcarriers or symbol information associated with one OFDM technology using another OFDM technology.

In some implementations, an OFDM transmitter uses this approach to map or assign different subsets of the available OFDM subcarriers to different OFDM signals (signals associated with different OFDM protocols) in a way that the data contained in the signals can be transmitted at the same or during an overlapping time interval. This approach may be useful in implementations where different OFDM signals (e.g. an LTE Discovery Reference Signal (DRS) and an 802.11 signal) need to be sent to different OFDM receivers (e.g. LTE and Wi-Fi receivers) at the same time. The approach may also be useful in implementations where the nature of the OFDM signals and/or channel over which the signals are transmitted is such that the OFDM signals can be transmitted using some but not all of the available OFDM subcarriers and still be recovered at a suitable Signal-to-Noise (SNR) ratio by the intended OFDM receiver.

The description that follows describes how nodes in a first or base OFDM network (e.g. a License Assisted Access (LAA)—Long Term Evolution (LTE) Radio Access Network (RAN)) configured to transmit subcarrier and/or symbol information of a first OFDM type can also transmit subcarrier and/or symbol information of a second OFDM type (either concurrently or at different times) which can be detected by wireless devices in one or more second OFDM network(s) such as for example, a Wireless (e.g. Wi-Fi) Local Area Network (WLAN). However, those having ordinary skill in the relevant art will readily appreciate that the principles described herein may equally apply to other types of networks.

For example, the first OFDM network may also include other $3^{rd}$ Generation Partnership Project (3GPP) networks (e.g. Universal Mobile Telecommunications System (UMTS), LTE-Advanced (LTE-A)), LTE-Unlicensed (LTE-U), $4^{th}$ Generation (4G), $5^{th}$ Generation (5G) or other future generations of a 3GPP communication network infrastructure. More generally, the first OFDM network may include any current or future wireless network infrastructure configured to generate subcarriers or symbol information associated with a different OFDM technology, with or without a licensed anchor band (so called "standalone" or single carrier access network).

Similarly, the second OFDM network(s) described herein primarily as WLANs (e.g. Wi-Fi) may also include other types of 802 networks such as a Wireless Personal Area Networks (WPAN) or a Wireless Metropolitan Area Networks (WMAN). However, the second OFDM network(s) may also include wireless networks that use a different OFDM technology such as for example 802.15 networks (e.g. ZigBee). More generally, the second wireless network(s) may include any OFDM network that uses a subcarrier spacing equal to or greater than the subcarrier spacing used in the first OFDM network. This is intended to include OFDM networks which are variations of the OFDM technology used in the first OFDM network but with a greater subcarrier spacing (e.g. a second LTE network with a subcarrier spacing greater than the carrier spacing of a first LTE network), For clarity and as used herein, the term WLAN or Wi-Fi is used to cover all of these possibilities for the second OFDM network(s).

Referring now to FIG. 1, there is shown one example of an LAA-LTE RAN 10 (an example of the first OFDM network) in which an access node 60 is configured to transmit subcarrier and/or symbol information which can be detected by wireless devices 50, 52, 54, 56, 58 operating in WLANs 20, 30 (examples of a second OFDM network). As is conventional for LAA operation, the unlicensed band is used to operate a (secondary) carrier to add capacity to a (primary) carrier operating in licensed spectrum (e.g. an LTE carrier). Operation of the primary licensed carrier may be under the control of the access node 60 or another node in the LAA-LTE RAN 10.

The access node 60 is an eNodeB but in other implementations, the access node 60 may be a Node B (NB), evolved Node B (eNB), base station, base station controller (BSC), radio network controller (RNC), relay, donor node controlling relay, base transceiver station (BTS), transmission point, transmission node, remote RF unit (RRU), remote radio head (RRH), a node in a distributed antenna system (DAS), or a memory management unit (MMU). Generally, the access node 60 is configured to control transmissions to or from UEs in the LTE RAN 10 but other nodes in the LTE RAN 10, a Core Network (CN) 70 or in a network outside of a RAN/CN infrastructure (e.g. an Internet Protocol (IP) node in an IP network) may be configured for that purpose. In other implementations, a wireless device or UE (for example, a relay node UE) may be configured to transmit subcarrier and/or symbol information which can be detected by devices that use a different OFDM technology (e.g. devices in the WLANs 20, 30). It is to be understood that the functionality described herein in relation to nodes that are configured to transmit such subcarrier or symbol information in a wireless network may also equally apply to wireless devices (e.g. UEs) configured as such.

In FIG. 1, the access node 60 provides wireless devices within its coverage (e.g. devices 40, 50) with access to network services in one more core networks 70, in this example, an Evolved Packet Core (EPC) network which includes a Mobility Management Entity 74 and a Packet Data Network (PDN) Gateway (PGW) 72. Each wireless device 40, 50 is configured for wireless communication in the LAA-LTE RAN 10 (e.g. as a User Equipment (UE) and may be of any type, including for example a wireless terminal (also known as a mobile station, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a heart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device.

In the example of FIG. 1, the LAA-LTE RAN 10 shares the unlicensed band with WLANs 20, 30 for transmissions involving at least some of the wireless devices in its coverage (e.g. wireless device 50). Generally, the WLANs 20, 30 may each include any number of wireless devices communicating directly or via an Access Point (AP) with other devices in the same or different networks. In the example of FIG. 1, WLAN 20 is shown to include WLAN devices 52, 54, AP 58 as well as wireless device 50 while WLAN 30 includes WLAN devices 54 and 56. Other network configurations for WLANs 20, 30 or other types of networks or devices which may share unlicensed spectrum resources with device 50 in the LAA-LTE RAN 10 are possible.

As is conventional, devices 50, 52, 54 and AP 58 in WLAN 20 and devices 54, 56 in WLAN 30 (herein generically referred to as WLAN or Wi-Fi devices) are configured to share a band of spectrum using some form of media access method and/or transmissions based on contention. As is well-known, there are many examples of such contention-based approaches. Examples include Listen-Before-Talk (LBT), Carrier Sense Multiple Access (CSMA)—with Collision Detection (CSMA-CD), CSMA with Collision Avoidance (CSMA-CA), etc. Using a contention-based method, a WLAN device 50, 52, 54, 56, 58 will try to determine whether another transmission is in progress in the channel or band used. This determination may be based on the detection of a carrier wave, signal or energy in the channel of interest. If a carrier or energy is detected in the channel of interest (in another fully or partially overlapping channel), the WLAN device 50, 52, 54, waits for the transmission in progress to finish before initiating its own transmission.

In the example of FIG. 1, the LAA-LTE RAN 10 may include wireless devices 40 in a location outside the coverage of WLANs 20, 30, and with which spectrum resources are not shared. As a result, the wireless devices 40, 50 described in the embodiments herein may (but do not need to) be configured for operation on multiple different wireless networks. In the example of FIG. 1, wireless device 50 is configured as a dual-mode device (i.e. configured as a UE for operation in the LAA-LTE RAN 10 as well as a WLAN device for operation in WLANs 20, 30) while wireless device 40 is configured as a UE for operation in the LAA-LTE RAN 10 only. For clarify, the principles of the present disclosure apply whether or not wireless devices 40, 50 in the LAA-LTE RAN 10 are configured as single-mode or multi-mode devices.

3GPP systems such as the LAA-LTE RAN 10 of FIG. 1 typically operate outdoors, usually from high powered macros cell sites designed to cover ranges up to several kilometers. The resulting coherence bandwidth of the channel is very small as the delay spread (i.e. the impulse response of the channel) can be quite large due to distant reflections from building and other environmental factors. To address this issue, 3GPP systems break the available bandwidth into many narrower sub-carriers or sub-channels and transmit the data in parallel streams. FIG. 2A shows a time-frequency diagram 80 of a set of LTE sub-channels (only a subset shown) used in a channel of the LTE RAN 10 of FIG. 1. The LTE sub-channels are 15 KHz wide and correspond to a set of LTE sub-carriers L-SC$_{1-M}$, typically 1200 (M=1200) for a 20 MHz channel. In that example, each LTE subcarrier L-SC$_{1-M}$ is modulated using varying levels of QAM modulation, e.g. QPSK, QAM, 64QAM or possibly higher orders depending on signal quality. Each OFDM symbol 82 is therefore a linear combination of the instantaneous signals on each of the sub-carriers L-SC$_{1-M}$ in the channel. Because data is transmitted in parallel rather than serially, LTE symbols 82 are generally much longer than symbols on single carrier systems of equivalent data rate. In the example of FIG. 2A, each LTE symbol 82 is 66.7 microseconds (μs) long and is preceded by a 4.7 μs cyclic prefix (CP) (not shown), which is used to reduce Inter-symbol Interference (ISI). The total symbol length (including the CP) is 71.4 μs.

Figure 2B:
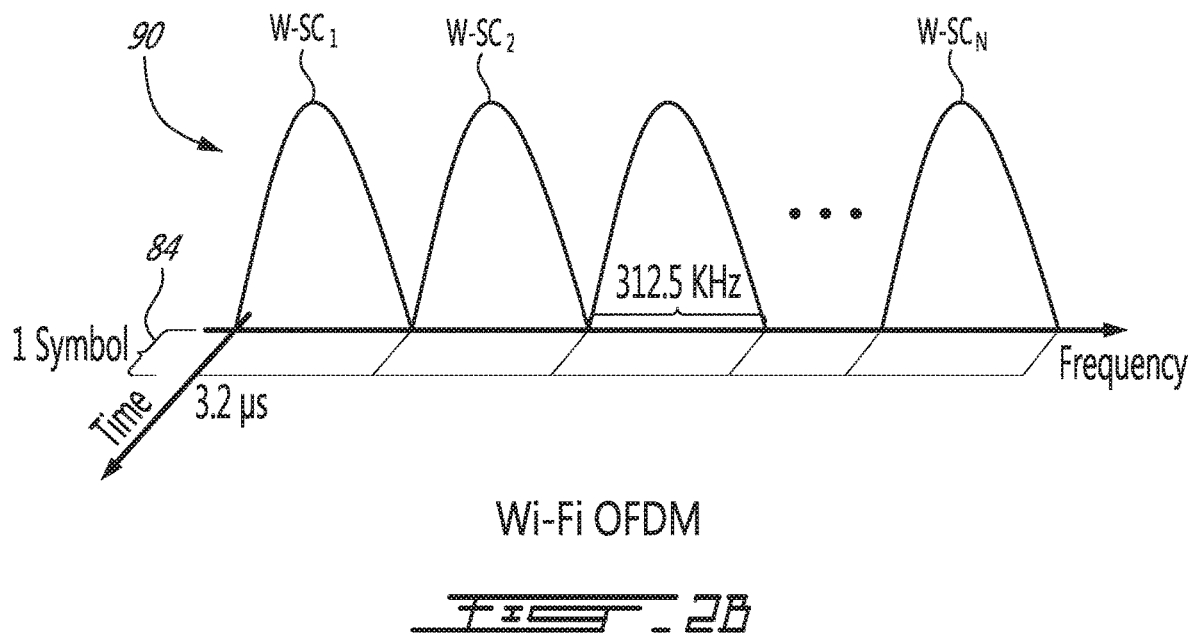

In contrast, Wi-Fi systems operate (mostly) indoors, usually from low power APs designed to cover ranges up to 50 or 100 meters. The resulting coherence bandwidth of the channel is large, as the delay spread (e.g. the impulse response of the channel) is usually very short, typically less than 500 nanoseconds (ns). As a result, Wi-Fi systems use wider 312.5 KHz sub-channels. FIG. 2B shows a time-frequency diagram 90 of a set of Wi-Fi sub-channels (only a subset shown) used in a channel of the WLANs 20, 30 of FIG. 1. The Wi-Fi sub-channels correspond to a set of Wi-Fi sub-carriers W-SC$_{1-N}$, typically 52 (N=52) in a 20 MHz channel, which are spaced apart by 312.5 kHz. Because of the larger sub-channel spacing, Wi-Fi symbols 84 are generally much shorter than LTE symbols 82. In the example of FIG. 2A, each Wi-Fi symbol 82 is 3.2 μs long and is preceded by a 0.8 μs cyclic prefix (CP) (not shown) for a total duration of 4 μs.

Understanding the differences in, for example the number of carriers, the carrier spacing and the symbol time duration, it is possible for one base OFDM system (denoted as OFDM1) configured to transmit information using its defined set of (base) subcarriers to also be configured to encode subcarrier or symbol information of another OFDM system (denoted as OFDM2) in a way that such information can be decoded by receivers configured in accordance with that other system. In some implementations, the subcarrier spacing $\Delta f_1$, symbol duration $T_1 = k_1/\Delta f_1$ and system bandwidth $BW_1$ of the OFDM1 system and those of the OFDM2 system ($\Delta f_2$, $T_2 = k_2/\Delta f_2$, and $BW_2$) are such that:

$$\Delta f_1 < \Delta f_2 \quad (1)$$

$$T_1 > T_2 \quad (2)$$

$$BW_1 = (M^* \Delta f_1) \geq BW_2 = (N^* \Delta f_2) \quad (3)$$

where
 $k_1$ and $k_2$ are integer values, which are typically set to 1,
 M is the number of OFDM1 subcarriers, and
 N is the number of OFDM2 subcarriers.

In other implementations, an OFDM1 transmitter is configured to generate and transmit subcarrier and/or symbol information of any OFDM2 system that uses a subcarrier spacing larger (or substantially larger, e.g. by a factor of 10 or 20) than the OFDM1 subcarrier spacing. Stated another way, the OFDM1 transmitter is configured to generate and transmit subcarrier and/or symbol information of any OFDM2 system that uses a symbol duration smaller (or substantially smaller, e.g. by a factor of 10 or 20) than the OFDM1 symbol duration. In typical LTE and Wi-Fi systems for example, the LTE subcarrier spacing is smaller than the Wi-Fi subcarrier spacing (which means the Wi-Fi symbol duration is smaller than the LTE symbol duration). In yet other implementations, the OFDM1 transmitter is configured to generate and transmit subcarrier and/or symbol information of any OFDM2 system that has a system bandwidth that is greater or equal to the OFDM1 system bandwidth. However, in other implementations, this may not be necessary. For example, while LTE can operate at multiple different system bandwidths (e.g. 5, 10, 15, 20 MHz) some of which may be smaller than the Wi-Fi system bandwidth, an LTE transmitter can generally be configured to utilize the available spectrum in a way that is sufficient for Wi-Fi transmissions (see for example the implementations described below in relation to FIGS. 7A-B).

Generally, therefore, it is possible for an LTE transmitter to encode and transmit Wi-Fi information in a way that it can be recovered by a Wi-Fi receiver. In some implementations, in addition to being configured to generate and transmit Wi-Fi and LTE symbol information, the LTE transmitter may also be configured to generate subcarrier and/or symbol information of yet other OFDM technologies.

In other implementations, an LTE transmitter (e.g. the access node 60 of FIG. 1) can use LTE subcarriers L-SC$_{1-M}$ to generate 802.11 (e.g. Wi-Fi) subcarrier or symbol information that can be understood by Wi-Fi receivers, for example to reserve the channel for a certain duration, to indicate a transmission time associated with an on-going and/or upcoming symbol transmission or to create a carrier sense indication, for example, to cause Wi-Fi receivers and other radio technologies to consider the channel as busy. The embodiments described below are primarily in relation to the generation of Wi-Fi subcarriers/symbol information in an LTE transmitter. However, it is understood that the same approach is equally applicable to other OFDM technologies such as for example 802.15 technologies (e.g. ZigBee). Generally, the principles described herein are applicable to generating subcarriers or symbol information from one OFDM technology using another OFDM technology.

FIG. 3 illustrates a timing diagram 100 showing an example of a symbol transmission by an LTE transmitting node (e.g. the access node 60 in the LTE RAN 10 of FIG. 1), in accordance with the principles described herein. In this example, the access node 60 is configured to transmit Wi-Fi information, for example Wi-Fi header and/or packet data to indicate its current use of a (unlicensed) channel shared with devices in the WLANs 20, 30 and/or to reserve the channel for a certain amount of time (further details below). The Wi-Fi information is modulated by the access node 60 in the form of a set of one or more Wi-Fi symbols 110, 112, 114 (only three shown) and transmitted during the duration of one LTE symbol 102 (e.g. 66.7 μs). In order to be properly decoded by devices in WLANs 20, 30, each Wi-Fi symbol 110, 112, 114 includes a respective CP 110a, 112a, 114a (e.g. 0.8 μs) and has a symbol duration (e.g. 3.2 μs) that conforms to the duration expected by devices in the WLANs 20, 30. In the example of FIG. 3, the number of Wi-Fi symbols 110, 112, 114 is designed to fit into one LTE symbol duration 102 (e.g. after an LTE symbol preamble or CP 102a) but in other implementations, the number of Wi-Fi symbols 110, 112, 114 is substantially less than one LTE symbol duration 102. In yet other implementations, the access node 60 uses up to sixteen Wi-Fi symbols 110, 112, 114 in a 66.7 μs LTE symbol time duration. In yet other implementations, the access node 60 uses some of the Wi-Fi symbols 110, 112, 114 for Wi-Fi header data and the rest for Wi-Fi packet or frame data, the size of which depends on the Wi-Fi modulation rate used. In yet other implementations, the Wi-Fi symbols 110, 112, 114 are organized in multiple sets to span over multiple LTE symbol durations where each set is configured to fit in the duration of one LTE symbol. In yet other implementations, the first Wi-Fi symbol set is preceded by an LTE CP (e.g. CP 102a), but subsequent Wi-Fi symbol sets are transmitted without an LTE CP to ensure proper recovery by Wi-Fi receivers. The Wi-Fi symbols 110, 112, 114 shown in FIG. 3 represent one particular type of Wi-Fi symbols that can be used (e.g. for Wi-Fi data transmissions). However, it is important to note that depending on the implementation and the type of Wi-Fi transmission desired, the principles described herein also equally apply to other types of Wi-Fi symbols. For example, short and long Wi-Fi symbols such as those defined for Short Training Fields (STFs) and Long Training Fields (LTFs) could be used. Further, the Wi-Fi symbols may or may not be transmitted with a CP and may have time duration that is different from the time duration of the Wi-Fi symbols 110, 112, 114 (e.g. other 3.2 μs). Other possibilities exist for the Wi-Fi symbols 110, 112, 114.

In some implementations, the Wi-Fi information contained in the Wi-Fi symbols 110, 112, 114 is to reserve the channel for the LTE transmission. In those implementations, the Wi-Fi information may be indicative of a transmission time, length, type associated with and/or a channel reservation time necessary for transmitting the Wi-Fi symbols 110, 112, 114, the LTE symbols 104 or a combination of both.

In some implementations, the access node 60 generates Wi-Fi symbols 110, 112, 114 to contain a Wi-Fi header or a Clear-To Send (CTS) packet such as a "CTS-to-Self" packet to reserve the channel with a "virtual carrier sense", enabling devices in the WLANs 20, 30 to receive this header/packet information down to −82 dBm or lower and refrain from transmitting until after the LTE transmission (e.g. the LTE symbols 104) has been sent. Moreover, in some implementations, by generating and transmitting both the Wi-Fi symbols 110, 112, 114 and the LTE transmission 104, the access node 60 can apply the same (LTE) processing functions such as filtering, PAR, digital pre-distortion, PSD management, RMS power control, etc., to the generation and transmission of both the Wi-Fi symbols 110, 112, 114 and the LTE transmission 104 which follows.

It is important to note that different Wi-Fi header and/or packet data may be used for different applications. Also, depending on the application, the Wi-Fi header and/or packet data transmission does not necessarily need to be preceded by or followed by an LTE transmission. For applications other than channel reservation for example, the Wi-Fi information can be transmitted as a stand-alone transmission. In one implementation, the access node 60 may also use Wi-Fi symbols 110, 112, 114 to send PROBE REQUEST packets to detect nearby Wi-Fi APs. In another implementation, the access node 60 uses the Wi-Fi symbols 110, 112, 114 to send disassociation or de-authentication packets to Wi-Fi Stations (clients) in an attempt to move them to the LTE RAN 10. Using the principles described herein, the access node 60 can use to Wi-Fi symbols 110, 112, 114 to send other types of Wi-Fi packets or frames including for example NULL packets, Wi-Fi sounding packets, LWA packets, Point Coordination Function (PCF) beacons, etc. In other implementations, instead of transmitting only Wi-Fi information or only LTE information at any given time, the access node 60 can be configured to transmit both Wi-Fi and LTE information concurrently. This will be explained below in greater detail starting with FIGS. 7A-B.

Turning now to FIGS. 4A-B, two different Wi-Fi transmissions 124, 134 that the access node 60 can use to reserve the channel for a subsequent LTE symbol transmission are shown. The LTE symbol transmission is shown as a series of Transmission Time Intervals (TTIs) 126a-d and 138a-d which, in this example, are 1 millisecond (msec) each in duration. Each of the Wi-Fi transmissions 124, 134 has a duration that fits within one LTE symbol but as noted above, the Wi-Fi transmissions 124, 138 may span multiple LTE symbols in other implementations. In the example of FIG. 4A, a Wi-Fi CTS-to-Self packet 124 is used to reserve the channel for TTIs 126a-d (only four shown) while in the example of FIG. 4B, a Wi-Fi header 134 is used for TTIs 138a-d.

According to principles of the present disclosure, each of the CTS-To-Self packet 124 and header 134 contains a channel reservation indication indicating an amount of time during which the access node 60 intends to use the channel. In some implementations, the reservation indication prevents listening devices (e.g. devices in the WLANs 20, 30 that have received and demodulated the indication) to perform any transmission until the reservation time has expired.

As described below in more detail, there are many possibilities for the channel reservation indication. In the example of FIG. 4A, the channel reservation indication is a Network Allocation Vector (NAV) indication in the CTS-To-Self packet 124. In some implementations, the NAV indication is a NAV timer value defining how long the channel will be reserved. In some implementations, the NAV timer value is indicative of a time required to transmit the CTS packet, the LTE TTIs 126*a-d* (e.g. NAV reservation time 128) and/or a combination thereof. In other implementations, the NAV timer value is an end time of the LTE TTI 126*a-d* transmission. The devices that receive and demodulate the CTS packet will refrain from transmitting until a timer set to the NAV timer value expires. In yet other implementations, the channel reservation indication is included in a different field of the CTS-to-Self packet 124. Generally, any packet data or any field of a Wi-Fi packet may be used for the channel reservation indication. In other implementations, the channel reservation indication is a value indicative of any one of a transmission length, time or type or a channel reservation time associated with the CTS-to-Self packet 124, the LTE symbols and/or both. Other possibilities exist for the channel reservation indication.

In the example of FIG. 4B, the channel reservation indication is a length reservation indication or other control data in the Wi-Fi header 134 representing an octet count associated with the LTE TTIs 138*a-d*. In other implementations, the length reservation indication (or control data) is a time duration required for transmitting the Wi-Fi header 134, the LTE TTIs 138*a-d* (e.g. length reservation time 140) and/or a combination thereof. In yet other implementations, the length reservation indication is an end time of the LTE TTI 138*a-d* transmission. In yet other implementations, the Wi-Fi header 134 and the LTE TTIs 138*a-d* may be viewed as a combined packet transmission 130 where the LTE TTIs 138*a-d* (and possibly other information) form the packet data payload with a length that corresponds to the length reservation indication. In those implementations, Wi-Fi receivers (e.g. devices in WLANs 20, 30) recover the Wi-Fi header 134 and refrain from using the channel until the packet data payload (e.g. the LTE TTIs 138*a-d*) has been completely transmitted while LTE receivers (e.g. the access node 60) are configured to receive and demodulate only the LTE TTIs 138*a-d* (the Wi-Fi header may be unrecoverable).

Depending on the nature of the channel reservation indication used, the Wi-Fi and LTE transmissions are either contiguous or non-contiguous transmissions. For example, the access node 60 may, in some implementations, initiate the LTE transmission immediately after completing the Wi-Fi transmission or alternatively, wait after a certain delay (e.g. as in FIG. 4A). In other implementations such as the example shown in FIG. 4B, the access node 60 transmits noise (or some RF power) during that delay to maintain the transmit power envelope and prevent Wi-Fi devices to assume the channel is free.

In some implementations, the access node 60 may continue to use the channel beyond the time duration or end time indicated by the channel reservation indication. For example, the access node 60 may also be configured for an additional transmission following TTIs 126*a-d* or TTIs 138*a-d*. The additional transmission may be an additional set of LTE TTIs or some other transmission (e.g. a Wi-Fi transmission) and is contiguous with the preceding TTIs 126*a-d*, 138*a-d* to prevent Wi-Fi devices from transmitting during the additional transmission. In those implementations, the channel reservation indication indicates how long the channel is reserved for the LTE TTIs 126*a-d*, 138*a-d* but not for the additional transmission.

In some implementations, the access node 60 performs a channel availability check using a contention-based method, for example Listen-Before-Talk (LBT) 122, 132 to determine whether another transmission is in progress in the channel or band used. This determination may be based on the detection of a carrier wave, signal or energy in the channel or band of interest (e.g. with a −62 dBm threshold). If during that time, a carrier or energy is detected in the band or channel of interest (in another fully or partially overlapping channel or band), the access node 60 waits for the transmission in progress to finish before initiating its own transmission. Alternatively, if no carrier or energy is detected, the access node 60 (immediately) transmits either the CTS-To-Self packet 124 or header information 134 and completes the subsequent LTE transmission (TTIs 126*a-d* or 138*a-d*).

FIG. 5 illustrates an example of a Physical Layer Convergence Protocol (PLCP) Protocol Data Unit (PPDU) 150 that includes the CTS-To-Self packet 124 shown in FIG. 4A in accordance with the principles described herein. In this example, the CTS-to-Self packet, denoted as 170, is included in a PLCP Service Data Unit field 156 of the PPDU 150 which also includes a preamble 152 and a header 154 (collectively herein referred to as header) as well as tail and pad fields 158, 160. The CTS frame 170 includes a frame control field 172 that specifies the type of frame 170 (in this case a CTS-To-Self frame), a duration field 174 to specify a NAV timer value, a Receiver Address (RA) field 176 which is set to the Transmitter Address for a CTS-To-Self packet and a Frame Check Sequence (FCS) field 178 which specifies an error-correcting code for the CTS packet 170. In some implementations, eleven Wi-Fi symbols, each 4 μs in duration, are required to transmit the CTS-To-Self packet 170 (as included in a PPDU 150) for a total transmission length of 44 μs which fits into a 71.4 or 83 μsecLTE symbol.

FIG. 6A illustrates an example of a format for the Wi-Fi header 134 shown in FIG. 4B in accordance with the principles described herein. In this example, the Wi-Fi header 134 is a PLCP header 208 which includes a preamble 202 and a Signal field (SIG) 204 (collectively herein referred to as header data) contains a channel reservation indication (in the SIG 204) to reserve the channel for a certain period of time. The channel reservation indication is set in a length field 214 as an octet count which is indicative of the amount of data to follow in a data field 206. Together with a modulation rate for the data specified in rate field 210, the channel reservation indication in the length field 214 is indicative of the time required to transmit or an end transmission time for the data (e.g. up to 5 msec). The data contained in the data field 206 and the PLCP header 208 are shown as a combined transmission 200 where the data field length corresponds to the channel reservation indication contained in the SIG 204. However, the PLOP header 208 and the data field 206 may be sent as two separate transmissions (e.g. non-contiguous transmissions). In some implementations, the data includes LTE symbols (e.g. LTE TTIs 138*a-d* in FIG. 4B) but in other examples, the data may include additional or other information such as Wi-Fi symbols and/or a random transmission (e.g. noise 136). Other possibilities exist for the data in the data field 206. As noted above, the data in the data field 206 may also be followed by an additional transmission, such as an additional set of LTE TTIs or some other transmission (e.g. a Wi-Fi transmission).

In addition to the length field 214, the SIG 204 also includes the rate field 210 that specifies a modulation rate for the data in the data field 206, a reserved field 212, a parity field 216, a tail field 218 and a service field 220. In some implementations, the tail field 218 is set to a value indicative of a type of symbols or OFDM associated with the data in the data field 206 (e.g. in this case an LTE type). In other implementations, the tail field 218 is set of a first value when LTE symbols are present in the data field 206 and a different value when non-LTE symbols (e.g. Wi-Fi symbols) are included). Advantageously, in some implementations, setting the tail field 218 to a value indicative of the presence of LTE symbols in the data field 206 notifies listening devices (devices configured to receive and demodulate the PLOP header 208) that the data field 206 contains symbols of a different OFDM type (e.g. LTE symbols). In other implementations, this indication is an OFDM indication and may be included in another field (other than the tail field 218 or the SIG 204) at the same or different layer. For example, in yet other implementations, the OFDM indication is included in a MAC layer protocol field, such as the Frame Control Field which contains bits (e.g. b0 and b1) normally used to specify an associated protocol. This OFDM indication may represent an OFDM type or mode or an OFDM parameter associated with the data in the data field 206 such as symbol duration, CP duration, number of subcarriers, subcarrier spacing, subcarrier modulation formats, subcarrier frequencies, etc.

FIG. 6B shows other format examples for the Wi-Fi header 134 shown in FIG. 4B that can be used by the access node 60 to reserve a channel according to the principles described herein. For a legacy mode, transmission 240 includes a Legacy (L) Short Training Field (STF) 242, a Legacy (L) Long Training Field (LTF) field 244, and a Legacy (L)-SIG 246 that contains a channel reservation indication to reserve the channel for the data (e.g. LTE symbols or Wi-Fi symbols) to be transmitted in data field 248. For a mixed mode, transmission 250 includes an L-STF 252, an L-LTF 254, an L-SIG 256, a High Throughput (HT)-SIG field 258, an HT-STF 260, an HT-LTF 262 and a data field 264. Either the L-SIG 246 or the HT-SIG 258 is configured to contain a channel reservation indication to reserve the channel for the data to be transmitted in the data field 264. For a green field mode, transmission 270 includes an L-STF 272, an HT SIG 274, an HT-STF 276, an HT-LTF 278 and a data field 280. The HT-SIG 274 is configured to contain a channel reservation indication to reserve the channel for the data to be transmitted in the data field 280. In some implementations, the data in the data field 248, 264, 280 includes LTE symbols (e.g. LTE TTIs 138a-d in FIG. 4B) but in other examples, the data may include additional or other information such as Wi-Fi symbols and/or a random transmission (e.g. noise 136). Other possibilities exist for the data in the data field 248, 264, 280. As noted above, the data in the data field 248, 264, 280 may also be followed by an additional transmission, such as an additional set of LTE TTIs or some other transmission (e.g. a Wi-Fi transmission).

Although the examples provided above show that the channel reservation indication used is a length value included in a SIG field, other possibilities exist. Generally, any control data or field in the Wi-Fi header 134 can be used for the channel reservation indication. In other implementations, the channel reservation indication is a value indicative of any one of a transmission length, time or type or a channel reservation time associated with the Wi-Fi header 134, the data in the data field LTE symbols and/or both. Other possibilities exist for the channel reservation indication.

In yet another channel reservation implementation, a Wi-Fi header or preamble transmission (such as the Wi-Fi header 134 shown in FIG. 4B) spanning over one entire LTE symbol duration (e.g. 66.7 µs) may be used to reserve a channel. In one example, a series of 3 Wi-Fi headers, each including a set of LTF, STF and SIG fields plus an additional STF field is used. The Wi-Fi headers may be preceded by an LTE symbol preamble or CP (e.g. CP 102a of FIG. 3). Note that other combinations of Wi-Fi header information may be used for the transmission, including for example:

repetitions of STF fields
repetitions of LTF fields
any repeated combination of one STF and two LTF fields
any repeated combination of two STF and one LTF fields
any permutation of 3 STF, 3LF and 3 SIG fields, and
permutations of STF, LTF, SIG and other Wi-Fi header fields.

In some implementations, the Wi-Fi header transmission described above is configured to fit within one LTE symbol time. However, depending on the application, the Wi-Fi header transmission may span multiple LTE symbols. Also, the Wi-Fi header transmission does not necessarily need to be preceded by or followed by an LTE transmission. For applications other than channel reservation for example, it may be transmitted as a stand-alone transmission.

The examples described above (e.g. FIGS. 3 and 4) show that the Wi-Fi and LTE transmissions are sequential. However, in some implementations, it may be desirable or necessary to transmit Wi-Fi and LTE information concurrently. In those cases, the access node 60 maps or assigns different subsets of the available OFDM subcarriers to the different OFDM signals in a way that the data contained therein can be transmitted at the same or during an overlapping time interval.

Figure 7A:
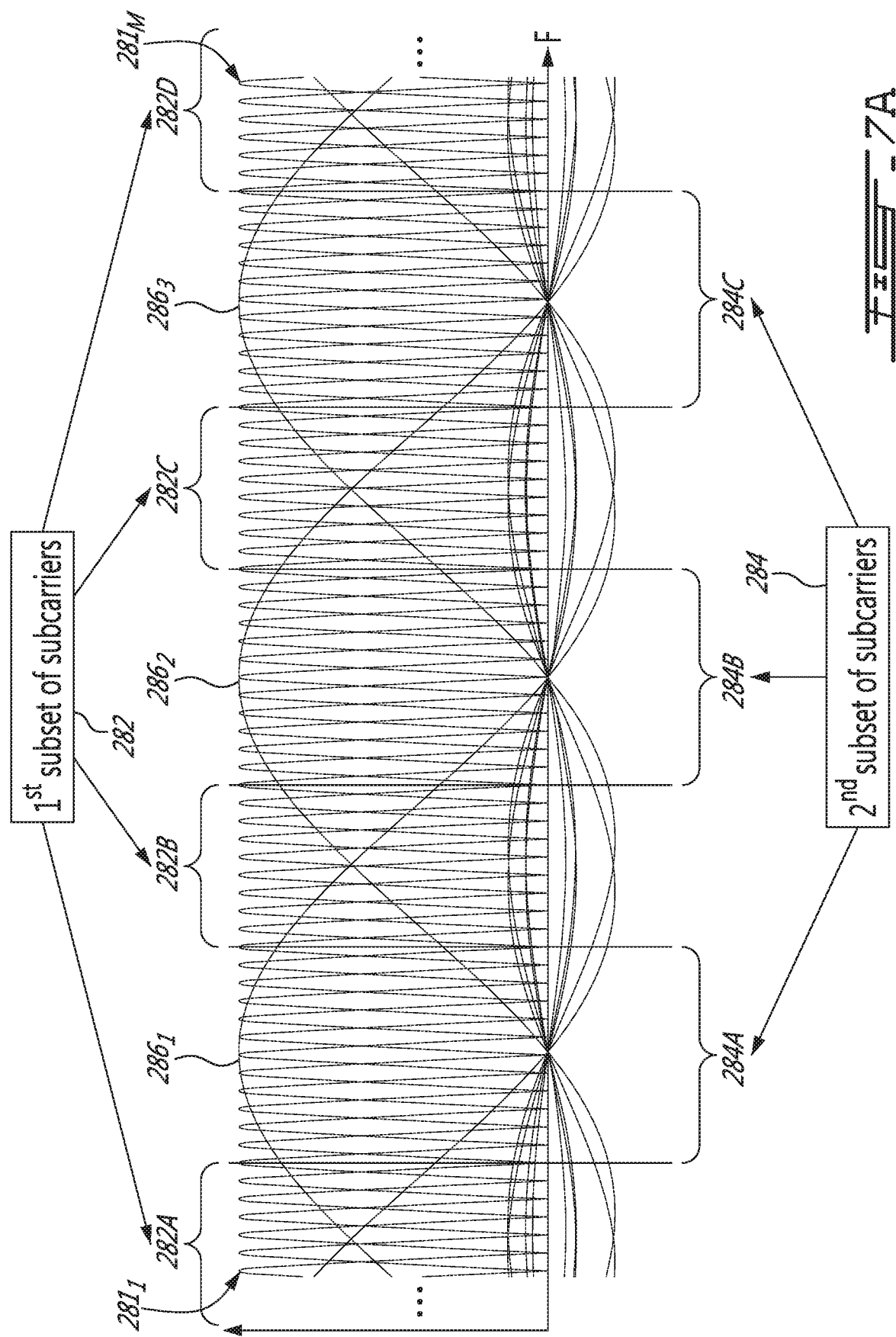
FIGS. 7A-B illustrate the partitioning of OFDM subcarriers into two subsets for generating and/or transmitting OFDM signals of different types in accordance with the principles described herein.

FIG. 7A illustrates an example of how an OFDM1 transmitter (e.g. the access node 60) configured to use OFDM1 subcarriers can partition the available subcarriers, denoted here as $281_{1-M}$, into two subsets which can then be used for generating and/or transmitting OFDM signals carrying information associated with different OFDM communication protocols at the same time. In this example, a first subset of OFDM1 subcarriers 282 is used for generating and/or transmitting a first OFDM signal (e.g. a first OFDM1 signal) containing data associated with a first OFDM communication protocol (denoted as OFDM1). Similarly, a second subset of OFDM1 subcarriers 284 is used for generating and/or transmitting a second OFDM signal (e.g. a second OFDM1 signal) containing data associated with a second OFDM communication protocol (denoted as OFDM2) but which, conventionally, would be generated and transmitted using OFDM2 subcarriers (shown in FIG. 7A as $286_{1-3}$). As it can be seen, an OFDM1 transmitter can generate and/or transmit the first and second OFDM1 signals because they both use OFDM1 subcarriers. In some implementations, the first OFDM1 signal is generated by mapping a predetermined OFDM1 signal (e.g. a DRS signal) to the first subset 282 while the second OFDM1 signal is generated by mapping a predetermined OFDM2 signal (e.g. the CTS-to-Self packet 124 or Wi-Fi header 134 of FIG. 4B) to the second subset 284. The first and second subsets 282, 284 are formed of a number of interleaved groups of contiguous OFDM1 subcarriers (four shown for the first subset ($282_{A-D}$) and three for the second subset ($284_{A-C}$)). However, it is important to note the other possibilities exist. For example, depending on the number of OFDM protocols to support, a different number of subsets 282, 284 may be used. Also, the subcarriers in each subset 282, 284 may be contiguous or non-contiguous (in frequency) and the number and/or placement of subcarriers contained in each subset 282, 284 may vary, for example, depending on the nature of the OFDM signals and/or data they contain.

Generally, the subcarriers for the second subset 284 are selected such that there is sufficient overlap in frequency with the OFDM2 subcarriers to ensure the second OFDM1 signal carrying the OFDM2 information can be recovered by the intended OFDM2 receiver(s). However, depending on the signal quality required and/or the level of distortion that can be tolerated, the number of OFDM1 subcarriers overlapping with OFDM2 subcarriers may vary. In some implementations, the subcarriers for the second subset 284 include at least one subcarrier that overlaps in frequency with an OFDM2 subcarrier. In the example of FIG. 7A, each of the subcarrier groups $824_{A-C}$ include at least one subcarrier that overlaps with the main lobe of an OFDM2 subcarrier $286_{1-3}$. However, it is to be understood that other possibilities exist for the second subset 284. In other implementations, the second subset 282 only includes subcarriers that overlap in frequency with an OFDM2 subcarrier (or a main lobe thereof).

In other implementations, to improve the quality that may be required for the OFDM2 signal, reduce the level of distortion that can be tolerated and/or improve the probability of successful detection by an OFDM2 receiver, the second subset 284 includes some of the OFDM1 subcarriers that normally are part of the frequency resources defined to be used for the predetermined OFDM1 signal but happen to overlap with an OFDM2 subcarrier (of a main lobe thereof). In other words, some of the OFDM1 subcarriers defined for the predetermined OFDM1 signal but which overlap with an OFDM2 subcarrier are not mapped or modulated with the predetermined OFDM1 information but are used instead to transmit the OFDM2 signal containing OFDM2 information. In yet other implementations, the OFDM1 subcarriers defined for the predetermined OFDM1 signal which also happen to overlap with an OFDM2 subcarrier (or a main lobe thereof) may instead be "blanked" or "muted" i.e. not included in any of the first or second subsets 282, 284 and therefore not used for transmitting either the first or second OFDM1 signals. All of these possibilities may be referred to as "puncturing" of the predetermined OFDM1 signal. Other ways of puncturing the predetermined OFDM1 signal are possible.

Figure 7B:
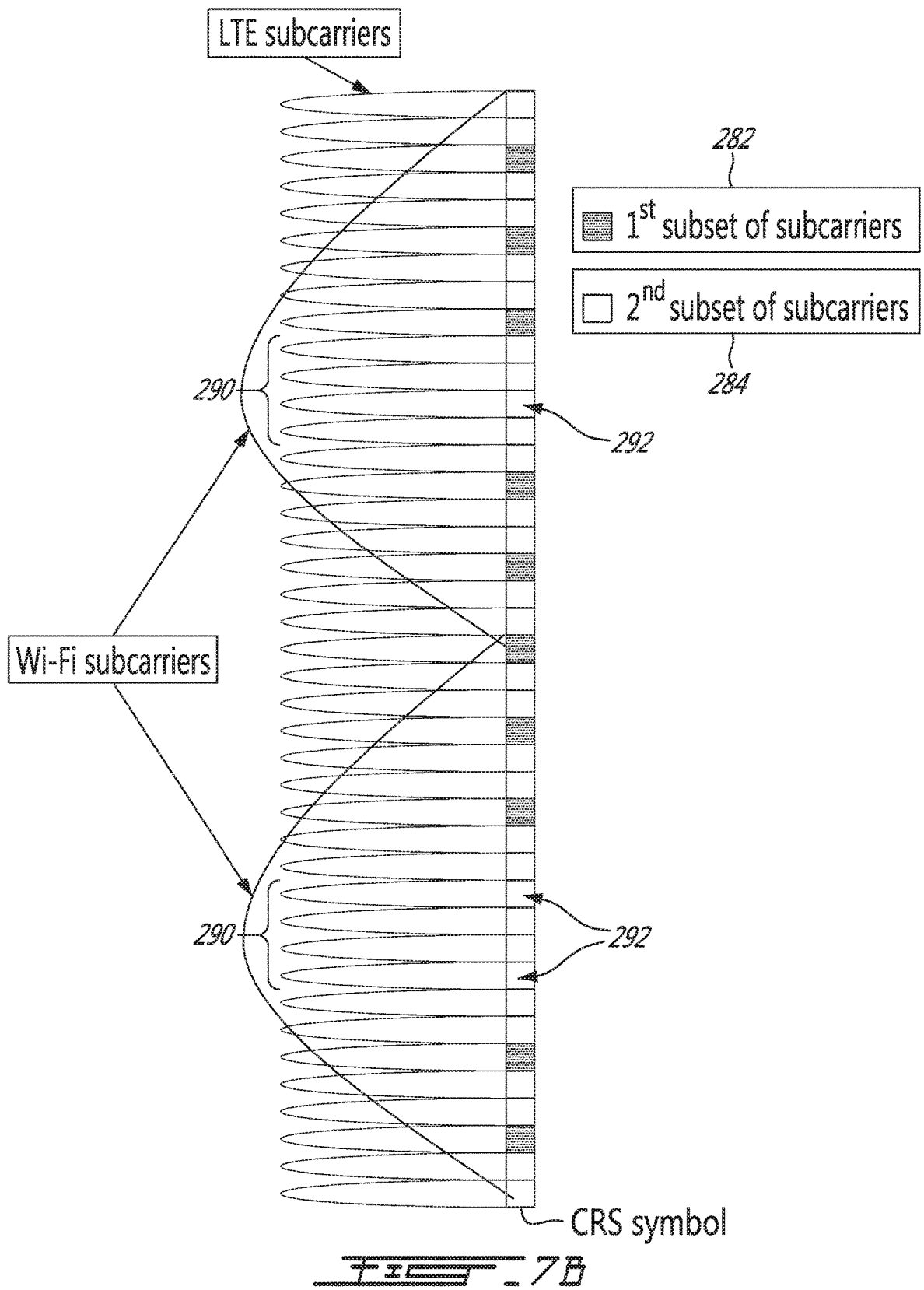

FIG. 7B illustrates a more specific example where an LTE transmitter (e.g. the access node 60) configured can partition the LTE subcarriers available across the system bandwidth into two subsets, also denoted here as 282, 284, which can then be used for generating and/or transmitting a predetermined Wi-Fi signal (e.g. the CTS-to-Self packet 124 or Wi-Fi header 134 of FIG. 4B) concurrently with a predetermined LTE signal (in this example a DRS signal) that may need to be transmitted within a certain time window and/or with a certain periodicity.

The ability to transmit DRS and Wi-Fi signals at the same time may be beneficial in implementations where the Wi-Fi transmission overlaps in time with a required DRS transmission. The DRS signal which is employed for providing Radio Resource Management (RRM) functionality for LAA operation, was introduced in 3GPP (Release 12) to support secondary cell ("SCell") activation and deactivation. SCells that are not activated for any UEs may generally be turned off except for periodic DRS transmissions. A conventional DRS transmission is allocated predetermined or defined Resource Elements (RE) across the system bandwidth and typically includes any combination of the following signals:

Primary Synchronization/Secondary Synchronization Signals (PSS/SSS)

Cell Specific Reference Symbol (CRS) signals,

Channel-State Information Reference Signals (CSI-RS)

The information carried by the DRS typically contains cell and/or PLMN identification as well as other control information that may be required for proper LAA operation e.g. to enable UEs to identify a detected cell and/or the operator of the cell. The DRS is transmitted in DRS occasions that may have a periodicity of 40, 80 or 160 msec. When LBT is applied to DRS transmissions, there will be some instances where the DRS cannot be transmitted periodically as it may in licensed spectrum. According to 3GPP standards, the DRS cannot exceed 1 msec in duration (i.e. 1 sub-frame) but is allowed to move within a Discovery Measurement Timing Configuration (DMTC) window of six sub-frames (or 6 ms) within which UEs can attempt to detect and measure DRS transmissions of serving and adjacent LAA cells. A typical DRS transmission is defined to include CRS signals in symbols 0, 1 and 4 of slots 0 and 1 (using every $3^{rd}$ RE), PSS/SSS signals in symbols 5/6 of slot 0 (using all REs), and Non-Zero Power (NZP)-CSI-RS signals in symbols 2, 3 of slot 1 (using every $12^{th}$ RE). All other REs may be used for CSI-RS signals (ZP or NZP), and/or control (e.g. PDCCH) or user (DPSCH) transmissions.

According to principles of the present disclosure, in order to concurrently transmit both DRS and Wi-Fi signals, the available LTE subcarriers are partitioned into two subsets, 282, 284. In the example of FIG. 7B, the first subset 282 includes the subcarriers necessary to transmit and generate a predetermined CRS signal (i.e. subcarriers corresponding to every $3^{rd}$ RE) while the remainder of the subcarriers are grouped into the second subset 284 and used for a Wi-Fi transmission (e.g. the CTS-to-Self packet 124 or Wi-Fi header 134 of FIG. 4B). Although limited to a CRS signal, it is understood that the principles described in relation to FIG. 7B are also applicable to other types of DRS transmissions (including PSS/SSS and/or CSI-RS transmissions or any combination thereof), other types of control LTE signals (e.g. PDCCH or PRACH signals) as well as generally, other types of OFDM1 signal transmissions that use OFDM1 subcarriers.

In some implementations, some or all of the LTE subcarriers 290 that overlap in frequency with a Wi-Fi subcarrier 286 (or a main lobe thereof) are included in the second subset 284. In other implementations, the LTE subcarriers 290 that correspond to defined CRS REs 292 and that overlap with a subcarrier 286 are included in the second subset 284. In the example of FIG. 7B, the overlapping subcarriers 290 defined to be used for CRS REs 292 are not mapped or modulated with CRS information but are instead used for transmitting Wi-Fi information. In other words, the CRS REs 292 using an overlapping LTE subcarrier 290 are punctured. In some of those implementations, this may be beneficial to improve the Wi-Fi signal quality required, reduce the level of distortion that can be tolerated and/or improve the probability of successful detection by a Wi-Fi receiver. It is understood that depending on the level of distortion and/or performance degradation that can be tolerated in the CRS signal, any number of CRS REs may be punctured, not necessarily only those that might overlap with a Wi-Fi subcarrier.

In other implementations, the CRS signal can be fully punctured if the channel is stationary or partially punctured (e.g. every second CRS RE) if the channel estimation by the UEs could be impaired if CRS is not properly detected. In yet other implementations, the CRS signal can be fully punctured if the coherence time of the channel (i.e. the time over which the amplitude fading is less than a defined threshold) exceeds the duration of an LTE slot (i.e. 0.5 msec) or a configurable fraction a (e.g. a value between 0 and 1). The configurable fraction a can be set by the LTE transmitter (e.g. the access node 60) or higher layer network nodes. In yet other implementations, some or all of the overlapping subcarriers 290 defined to be used for CRS REs 292 may instead be kept in the first subset 282. This may be beneficial in some of those implementations to improve the CRS signal quality required, reduce the level of distortion and/or improve the probability of successful CRS detection by an LTE receiver (for example to reduce the degradation of performance of channel estimation, enable proper RRM measurements, time/frequency tracking, etc.).

In yet other implementations where LTE subcarriers 290 defined to be use for CRS REs 292 are included in the second subset 284, instead of mapping the CRS signal only to LTE subcarriers in the first subset 282, the CRS signal is also mapped to some or all of the LTE subcarriers in the second subset 284 (e.g. those that are normally used or defined for CRS REs) but at a reduced power level (lower than a power level used for mapping the CRS signal to subcarriers in the first subset 282). In some of those implementations, this may be beneficial to reduce the impairment to the detection of the Wi-Fi transmission at a Wi-Fi receiver. Alternatively, or additionally, instead of mapping the Wi-Fi signal only to LTE subcarriers in the second subset 284, the Wi-Fi signal is also mapped to LTE subcarriers in the first subset 282 (e.g. those that overlap with a Wi-Fi subcarrier) but at a reduced power level (lower than a power level used for mapping the Wi-Fi signal to the subcarriers in the second subset 284). In some of those implementations, this may be beneficial to reduce the impairment to the detection of the CRS signal at an LTE receiver.

The above implementations assume that the LTE system bandwidth is at least equal or greater than the Wi-Fi system bandwidth (e.g. 20 MHz). In implementations where the LTE transmitter operates on a system bandwidth that is less than the Wi-Fi system bandwidth, the second subset 284 may only include LTE subcarriers that correspond to the lower frequency components of the Wi-Fi transmission (i.e. the higher frequency components of the Wi-Fi transmission are truncated and not transmitted). For example, if the LTE system bandwidth is 10 MHz, the second subset 284 only includes LTE subcarriers that correspond to the Wi-Fi frequency components below 10 MHz (thereby truncating the frequency components above 10 MHz up to 20 MHz). Alternatively, in other implementations, the second subset 284 may only include LTE subcarriers that correspond to the higher frequency components of the Wi-Fi transmission (i.e. the lower frequency components of the Wi-Fi transmission are truncated and not transmitted). Other possibilities exist for the second subset 284.

In addition to or as an alternative to transmitting OFDM2 information (e.g. a Wi-Fi header or CTS packet) using OFDM1 (e.g. LTE) subcarriers as described above, an OFDM1 transmitter may, in other implementations, use OFDM1 subcarriers which are located in unused portions of the OFDM2 system bandwidth (and hence orthogonal to subcarriers in the used portion) to transmit additional OFDM1 information. For example, as is well known, Wi-Fi transmissions typically span the entire Wi-Fi system bandwidth (e.g. 20 MHz), but some transmissions, such as STF, have a large number of "non-utilized" subcarriers, particularly in the band edges, where the energy contribution to the intended or desired signal is small in comparison to other subcarriers. In some instances, certain subcarriers are "nulled" or "zeroed", making their energy contribution negligible. In some implementations, the Wi-Fi system bandwidth is limited by the IEEE 802.11 specified transmit spectral mask, defined as fc±9 MHz (or 18 MHz wide) for a 20 MHz wide channel. For a 40 MHz wide channel, the IEEE 802.11 standard defines the transmit spectral mask as fc±19 MHz (or 38 MHz wide). Transmit spectral masks are also defined for 80 and 160 MHz wide channels. For legacy 802.11a/g transmissions, as are typically sent for CTS packets, the Wi-Fi system bandwidth is only 53*0.3125=16.5625 MHz, leaving 1.4375 MHz of "unused" spectrum. For HT or "High Throughput" 802.11n/ac transmissions, the Wi-Fi system bandwidth is 57*0.3125=17.8125 MHz, leaving 0.1875 MHz of unused spectrum at the band edges. In other instances, the subcarriers in the band edges are not employed to allow for sufficient attenuation of the transmitted signals' out-of-band emissions, for example, to accommodate filters in OFDM receivers designed without a sharp roll-off.

In all of these scenarios, some subcarriers in the Wi-Fi band may not be employed, even though they are part of the designed Wi-Fi system bandwidth. According to principles of the present disclosure, non-Wi-Fi OFDM transmitters (e.g. an LTE transmitter) can exploit these parts of the Wi-Fi spectrum to transmit additional, non-Wi-Fi data in a transmission that is orthogonal to any transmission occurring in the underlining Wi-Fi channel. This may be particularly useful for receivers designed (e.g. with tighter band edge filtering requirements) such that they are capable of recovering data transmitted in unused portions of the Wi-Fi system bandwidth as described herein and still meet the band edge emission requirements.

Figure 8:
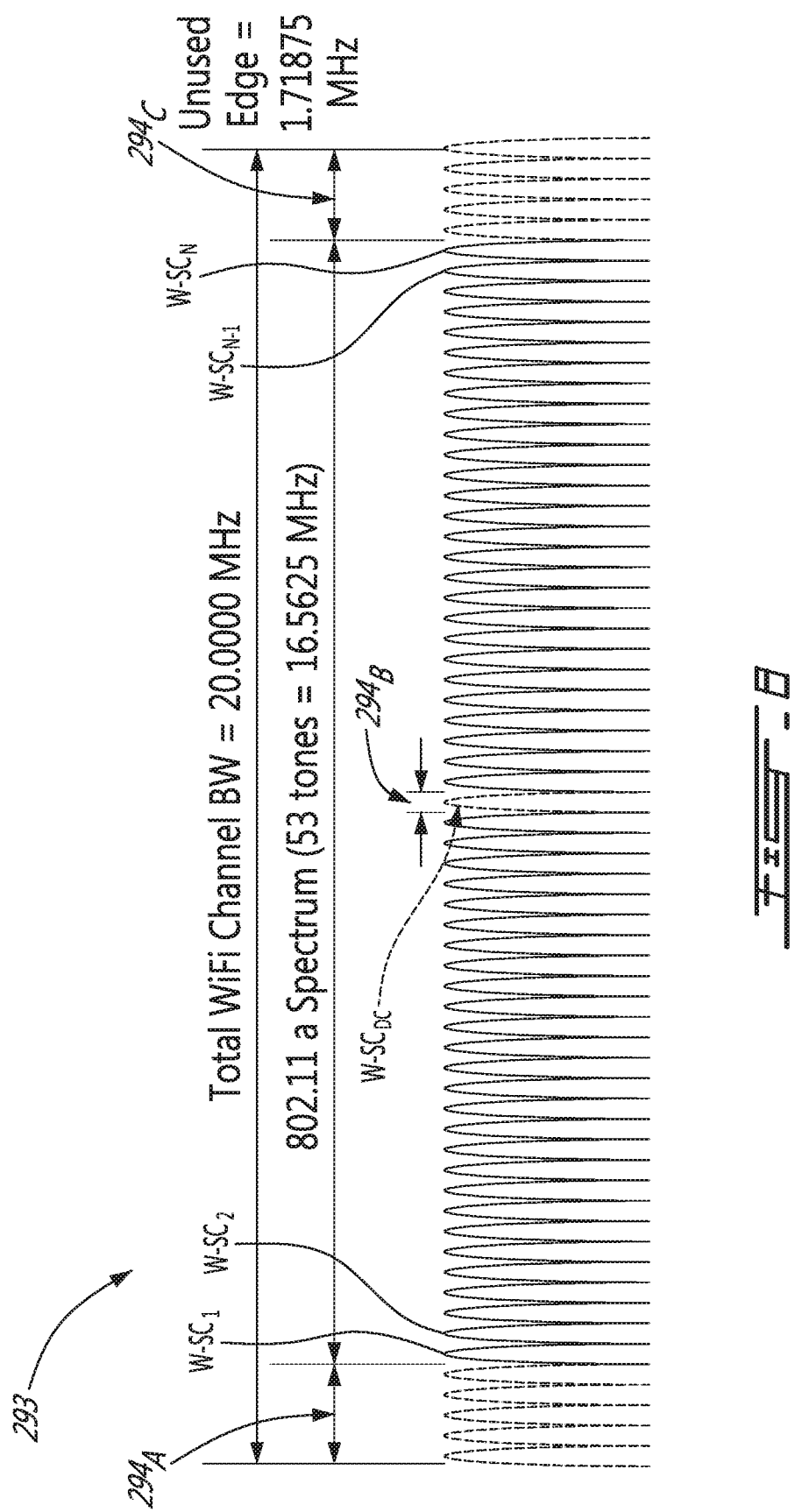
FIG. 8 illustrates an example frequency diagram of a 20 MHz Wi-Fi channel system bandwidth that includes portions not utilized by Wi-Fi subcarriers.

FIG. 8 shows an example frequency diagram of a 20 MHz 802.11a Wi-Fi channel system bandwidth that includes unused portions $294_A$, $294_C$ at the lower and upper edges as well as in a middle portion $294_B$ where the single 312.5 kHz Wi-Fi DC null subcarrier is normally set to zero. In that example, the amount of free, unused bandwidth at each of the lower and upper edges is 1.71875 MHz, which represents half of (20 MHz−53×312.5 kHz). In 802.11n, the system bandwidth is greater, with 52 data tones, and 4 pilot tones plus a DC Null used for a total bandwidth of (57*312.5 kHz=17.8125 MHz). Therefore, compared to 802.11a/g, 802.11n/ac supports an additional 1.09375 MHz of unallocated or unused spectrum at the edge of each channel band. Generally, depending on the type of OFDM2 communication protocol and the size of the channel (e.g. 20, 40, 80, 160 MHz), the size and location of unused spectral portions may be different.

According to principles of the present disclosure, an LTE transmitter operating in the same or an overlapping system bandwidth (e.g. 20 MHz in unlicensed spectrum) can therefore generate and/or transmit LTE signals using only those LTE subcarriers which are located in any one of the spectral portions $294_{A-C}$ not utilized or occupied by Wi-Fi subcarriers but located within the LTE system bandwidth. This approach applies irrespective of whether the LTE transmitter uses the entire Wi-Fi system bandwidth. In implementations where a smaller LTE spectrum (e.g. 18 MHz) is used for example, it is still possible for the LTE transmitter to generate and/or transmit LTE signals by locating LTE subcarriers in unused portions of the Wi-Fi system bandwidth that overlap with the used portion of the LTE system bandwidth. Also, because the 15 kHz LTE subcarrier spacing is substantially smaller than the 312.5 kHz Wi-Fi subcarrier spacing, a good number of LTE subcarriers orthogonal to the Wi-Fi subcarriers can be used. In addition, the same approach applies to implementations with a different LTE subcarrier spacing. A narrower LTE subcarrier spacing (for example, of 3.75 kHz) may be employed for 3GPP Narrowband Internet of Things (IoT) implementations, and future 3GPP 5G New Radio (NR) technology specifications may also include other subcarrier spacings such as 30 or 60 kHz, all of which are considerably less than the 312.5 kHz being employed in Wi-Fi.

By using LTE subcarriers in non-utilized portion(s) of the Wi-Fi system bandwidth, an LTE transmitter operating in the same or an overlapping system bandwidth can advantageously generate and transmit additional LTE data independently of whether the Wi-Fi channel is available or not. Also, as will be explained below in greater detail, if the Wi-Fi channel is busy, the LTE transmitter can limit its LTE transmissions to only use the LTE subcarriers in non-utilized portion(s) of the Wi-Fi system bandwidth. Alternatively, or additionally, if the Wi-Fi channel is idle, the LTE transmitter can be configured to operate as described above i.e. transmit LTE and Wi-Fi signals concurrently (by partitioning the LTE available subcarriers into first and second subsets 282, 284) or in sequence (e.g. by using the LTE subcarriers to generate and/or transmit a Wi-Fi signal to reserve the channel for a subsequent LTE transmission). And depending on the implementation, the number of LTE and Wi-Fi subcarriers used can be such that the LTE and/or Wi-Fi transmissions can be performed over either the entire LTE system bandwidth or limited to the Wi-Fi system bandwidth.

In implementations where the LTE subcarriers in non-utilized portions $294_{A-C}$ are used to transmit additional LTE data concurrently with a Wi-Fi transmission, the data can include one or more fields of the Wi-Fi transmission so that LTE receivers can be made aware of the concurrent Wi-Fi transmission and/or of an upcoming LTE transmission. For example, in the case of a CTS-to-Self packet used to reserve the channel for a subsequent LTE transmission, the additional LTE data could include the source and destination MAC addresses and duration field of the CTS packet. Generally, the additional LTE data can be predetermined and include one or more information fields or elements of a Wi-Fi header or CTS packet to be sent concurrently over (used portions of) the Wi-Fi system bandwidth as described above. In more advanced implementations, the additional data may include additional information specific to the LTE transmitter, such as a cell identification (ID), a location, or one or more connected network(s). Other possibilities exist for the LTE data transmitted over non-utilized portions of the Wi-Fi system bandwidth.

FIG. 9A shows a frequency diagram example where 114 LTE subcarriers of 15 kHz located in non-utilized edge portions of a Wi-Fi 20 MHz channel are used to generate and/or transmit LTE signals. For the sake of simplicity, FIG. 9A only shows the LTE subcarriers in upper edge portion $294_C$ but although not shown, it is understood that a similar number of additional LTE subcarriers could be located in the lower edge portion $294_A$ as well as up to 20 additional LTE subcarriers could be used in the middle portion $294_B$ (normally the Wi-Fi DC Null subcarrier spacing).

In some implementations, the LTE subcarriers in the non-utilized portions $294_{A-C}$ are included in the first subset 282 and the LTE subcarriers located within the portion of the Wi-Fi band normally occupied by Wi-Fi subcarriers (i.e. a utilized portion)) are included in the second subset 284 and used to generate and/or transmit Wi-Fi signals as described above in relation to FIGS. 7A-B. However, in implementations where the LTE transmitter is equipped with Wi-Fi circuitry (e.g. a Wi-Fi module or transceiver), it is entirely possible for the LTE transmitter to be configured to generate and/or transmit Wi-Fi signals using Wi-Fi subcarriers instead. In yet other implementations, if the Forward Error Correction (FEC) measures applied are sufficient to mitigate the effects of fading (where a portion of the Wi-Fi channel is lost due to destructive multipath interference), some of the subcarriers used in the second subset 284 (either Wi-Fi or LTE subcarriers) on each side of the Wi-Fi band may instead be replaced with LTE subcarriers and allocated to the first subset 282 (in addition to LTE subcarriers located in the unused portions $294_{A-C}$ of the Wi-Fi band, leaving even more bandwidth to additional LTE data. Other possibilities exist for the first and second subsets 282, 284.

FIG. 9B shows another frequency diagram example where the power level or amplitude of the LTE subcarriers in the upper edge portion $294_C$ has been adjusted to meet a 20 MHz power spectral density mask 295 that might be imposed on transmissions within and around the Wi-Fi system bandwidth. In this example, the upper edge of the transmit mask 295 is flat up to +9 MHz from the channel center, then drops 20 dBr over the next 2 MHz to +11 MHz from the channel center.

By design, Wi-Fi receivers can handle high levels of (first) Adjacent Channel Interference (ACI) from channels which are ±20 MHz from the active 20 MHz Wi-Fi channel, and higher levels of (second) ACI from channels which are ±40 MHz from the active 20 MHz Wi-Fi channel. ACI channels are sufficiently far enough away from the active 20 MHz channel, that filtering techniques can be applied to mitigate the high power interference signals which are not following the OFDM subcarrier spacing in the 20 MHz Wi-Fi channel. FIGS. 9C and 9D show other frequency diagram examples where the power level of all of the LTE subcarriers in the upper edge portion $294_C$ and the middle portion $294_B$ has been lowered relative to a power level of the Wi-Fi subcarriers so that the energy from the additional LTE subcarriers does not significantly affect the Wi-Fi OFDM receiver. In some implementations where Wi-Fi receivers require a Signal-to-Interference-plus-Noise-Ratio (SINR) of 5 dB (e.g. (for Binary Phase Shift Keying (BPSK) modulation signals), and up to 27 dB (for 64 QAM, Multiple-Input Multiple-Output (MIMO) signals), the total relative power of the injected LTE subcarriers should be lower than the desired Wi-Fi SINR by 10 dB so as not to affect the Wi-Fi receive sensitivity by more than 0.1 dB. In other implementations, the additional LTE subcarriers represent less than 10% of the Wi-Fi channel bandwidth (or less than 2 MHz) and as such, their total relative power is already lower by 10 dB.

In yet other implementations, the total relative power of the additional LTE subcarriers is reduced by the desired Wi-Fi SINR. For low modulation rate BPSK transmissions, the power level of the LTE subcarriers is reduced by 5 dB while the power level for high modulation rate (e.g. 64 QAM) MIMO transmissions, may require a further reduction (e.g. 30 dB). But other possibilities may exist for the power level of the additional LTE subcarriers. In yet other implementations, the LTE subcarriers are transmitted at the same or even higher power than the Wi-Fi carriers.

Although not shown, it is important to note that the same power control principles described above in relation to LTE subcarriers in non-utilized upper edge portion $294_C$ are equally applicable to the LTE subcarriers which may be located in non-utilized lower edge and middle portions $294_A$ and $294_B$ shown in FIG. 8.

There are many different configurations that can be used in an LTE transmitter to generate Wi-Fi signals. In one example, the LTE transmitter configuration may include two separate and independent physical layers (LTE and Wi-Fi), with different ASIC components and/or circuitry that reflect differences in for example, the symbol durations, cyclic prefix durations, number of subcarriers, subcarrier spacing, subcarrier modulation formats, subcarrier frequencies, or any one of numerous MAC layer differences, but it does not preclude that a common ASIC or other hardware circuitry can be configured to support both OFDM technologies. However, in other implementations, it is possible to integrate both OFDM technologies into the same device or set of components and configure these components to operate either in an LTE or Wi-Fi mode. The transmitter configuration examples provided below apply to equally to implementations with dedicated circuitry or common to all OFDM technologies supported (and operable in different modes).

Figure 10A:
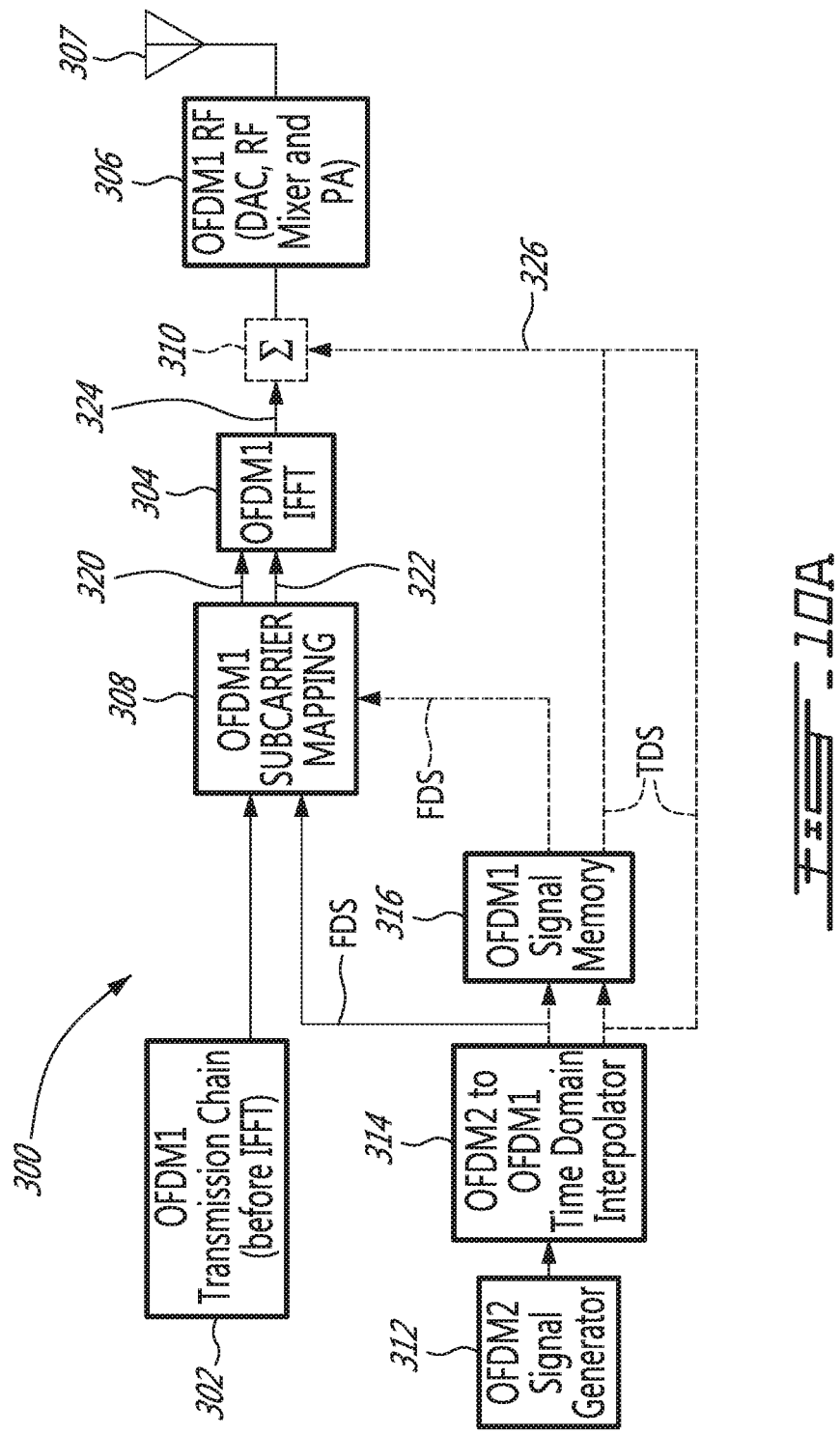
FIGS. 10A-B illustrate block diagram examples of an OFDM transmitter configured in accordance with the principles described herein.
Figure 10B:
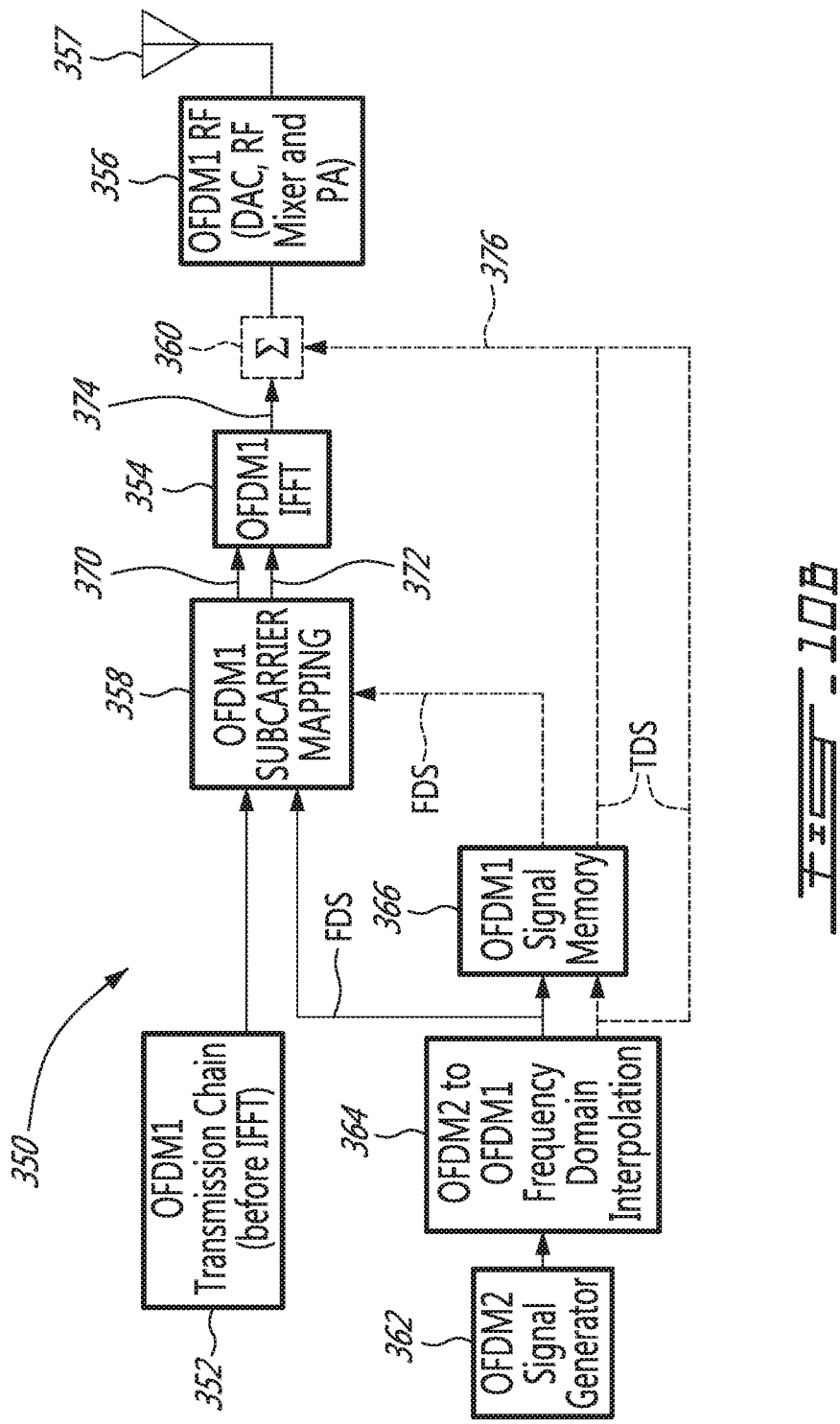

Turning now to FIGS. 10A and 10B, there is shown two different block diagram examples of an OFDM transmitter 300, 350 of a first (or base) OFDM technology, denoted as OFDM1 (e.g. a 3GPP or LTE technology), which, in addition to being configured to use some or all of M base subcarriers for OFDM1 transmissions, is also configured to transmit subcarrier or symbol information of another OFDM technology, denoted as OFDM2 (e.g. a Wi-Fi technology), using some or all of the M subcarriers. Generally, the OFDM1 transmitters 300, 350 operate in a similar fashion but as will be explained below in greater detail, implementations of the OFDM1 transmitter 300 use time-domain interpolation to generate the OFDM2 information (e.g. using a Time-Domain (TD) Interpolator 314) while implementations of the OFDM1 transmitter 350 use frequency-domain interpolation instead (e.g. using a Frequency-Domain Interpolator 364).

In some implementations, the OFDM1 transmitter 300, 350 is configured to generate OFDM1 signals carrying OFDM1 or OFDM2 information and to transmit the signals generated concurrently or in sequence. In some implementations, the first and second OFDM1 signals are transmitted concurrently over an OFDM2 system bandwidth (e.g. a Wi-Fi system bandwidth), where, for example, the second OFDM1 signal is transmitted over portion(s) of the OFDM2 system bandwidth normally used or occupied by OFDM2 subcarriers while the first OFDM1 signal is transmitted over non-utilized portion(s) of the OFDM2 system bandwidth. The first OFDM1 signal may be generated by mapping a first predetermined OFDM1 signal to a first subset of the available OFDM1 subcarriers (e.g. OFDM1 subcarriers located in unused portions of the OFDM2 system bandwidth) while the second OFDM1 signal may be generated by mapping a second predetermined OFDM2 signal (e.g. a CTS-to-Self packet or Wi-Fi header) to a second subset of the OFDM1 subcarriers (e.g. OFDM1 subcarriers located in the used portions of the OFDM2 system bandwidth). In some of those implementations, the first OFDM1 signal may include parameters or data indicative of the concurrent OFDM2 transmission so that OFDM1 receivers can be made aware of the concurrent OFDM2 transmission and/or any subsequent OFDM1 transmissions.

Accordingly, after transmitting the second OFDM1 signal carrying OFDM2 information, the OFDM1 transmitter 300, 350 may be additionally configured to transmit a subsequent (e.g. a third) OFDM1 signal using the M OFDM1 subcarriers. The OFDM2 information transmitted and subsequent OFDM1 signal transmission may be contiguous or non-contiguous. The OFDM1 transmitter 300, 350 may use the OFDM2 transmission to encode various types of OFDM2 related information for various purposes, including for example to reserve a channel for a certain duration, to indicate a transmission time associated with the OFDM2 and/or the subsequent OFDM1 signal transmission or to create a carrier sense indication, for example, to cause OFDM2 receivers to consider the channel as busy. In some implementations, the OFDM2 transmission includes Wi-Fi header data and/or Wi-Fi packet data and the subsequent OFDM1 signal transmission includes LTE data (or LTE TTIs) and the Wi-Fi header or packet data in the OFDM2 transmission is indicative of a transmission length, a transmission time, a transmission type and/or a channel reservation time associated with the Wi-Fi header/packet data, the LTE data or a combination of both.

The OFDM1 transmitter 300 has an OFDM1 transmission chain 302, an OFDM1 subcarrier mapping unit 308, an OFDM1 Inverse Fast Fourier Transform (IFFT) unit 304 and an OFDM1 RF unit 306 (e.g. DAC, mixer, and PA) which, in combination, are configured to generate and transmit a first OFDM1 signal 320 via one or more antennas 307. In some implementations, the OFDM1 transmission chain 302 generates (i.e converts) a serial OFDM1 symbol stream of Binary Phase Shift Keying (BPSK) or Quadrature Amplitude Modulation (QAM) data into M parallel streams. The OFDM1 transmission chain output (e.g. a predetermined OFDM1 signal) is modulated onto (some or all of) the M base OFDM1 subcarriers via the OFDM1 subcarrier mapping unit 308 to produce the first OFDM1 signal 320 which, after conversion into the time domain in the IFFT unit 304, is transmitted via the RF unit 306 and antenna 307.

According to principles of the present disclosure, the OFDM1 transmitter 300 also includes circuitry that is configured to produce a second OFDM1 signal 322 to carry OFDM2 information for transmission via the antenna 307. In one implementation, the circuitry includes an OFDM2 signal generator 312 configured to generate an OFDM2 signal. The OFDM2 signal is a time-domain signal that contains predetermined or defined OFDM2 symbol information generated with, for example, N OFDM2 subcarriers. In that implementation, the circuitry further includes an OFDM2-OFDM1 Time-Domain (TD) interpolator 314 that interpolates in the time-domain the OFDM2 signal generated (further details below). The output of the TD interpolator 314, a frequency-domain signal carrying the OFDM2 information and denoted as FDS in FIG. 10A, is modulated onto (some or all of) the M base OFDM1 subcarriers via the OFDM1 subcarrier mapping unit 308 to produce the second OFDM1 signal 322 which, after conversion into the time domain in the IFFT unit 304, is transmitted via the RF unit 306 and antenna 307

However other possibilities exist. In another implementation, the circuitry includes an OFDM1 signal memory 316 where the FDS signal is stored. When the OFDM1 transmitter 300 determines that OFDM2 information needs to be transmitted, it generates the FDS dynamically (e.g. on the fly) using the signal generator 312 and TD interpolator 314 or simply reads the FDS signal from the signal memory 316 and routes it to the OFDM1 subcarrier unit 308. The OFDM1 subcarrier mapping unit 308 maps the FDS signal to (some or all of) the M OFDM1 subcarriers to produce the second OFDM1 signal 322 which is then coupled to the IFFT and RF units 304, 306 for transmission via the antenna 307. In implementations where the FDS signal is read from the signal memory 316, the circuitry may only include signal memory 316. In other implementations, the stored FDS signal is a predetermined or defined vector of OFDM1 (frequency-domain) subcarrier modulation values (e.g. a vector with M values) that includes values representative of predetermined or defined OFDM2 information.

In one example, the following vector of non-zero LTE subcarrier modulation values can be used by an LTE transmitter to produce an STF using a group of 2048 subcarriers (M=2048, sequentially numbered from −1024 to 1024):

STF_LTE_SCs=[−499, −415, −332, −249, −165,
   −82, 85, 168, 252, 335, 418, 502]

STF_LTE_SC_Value=√(13/6)*[1+$i$, −1−$i$,1+$i$, −1−$i$,
   −1−$i$,1+$i$, −1−$i$, −1−$i$,1+$i$,1+$i$,1+$i$,1+$i$]

Each of the twelve LTE subcarriers identified above in the STF_LTE_SCs array by sequence number is set to a corresponding non-zero modulation value in the STF_LTE_SC_Value array. In this example, the twelve LTE subcarriers identified above are those that overlap with at least one Wi-Fi subcarrier (or a main lobe thereof) i.e. the Wi-Fi subcarrier(s) normally used to produce an STF. However, depending on the implementation, there may be more or less LTE subcarriers included in the STF_LTE_SCs array to produce the STF. In some of these implementations all other LTE subcarriers (those not identified in the STF_LTE_SCs array) are set to a zero value (e.g. (0+0$i$)).

In another example, for an LTE transmitter configured to use 2048 subcarriers (M=2048), the following vector of LTE subcarrier modulation values can be used to produce an LTF:

LTF_LTE_SCs=[−540, −519, 499, −478, −457, −436,
   −415, −394, −374, −353, −332, −311, −290,
   −269, −249, −228, −207, −186, −165, −144,
   −124, −103, −82, −61, −40, −19, 22, 43, 64, 85,
   106, 127, 147,168, 189, 210, 231, 252, 272,
   293, 314, 335, 356, 377, 397, 418, 439, 460,
   481, 502, 522, 543]

LTF_LTE_SC_Value=[1,1, −1, −1,1,1, −1,1, −1,1,1,1,
   1,1,1, −1, −1,1,1, −1,1,1,1,1,1,1,1, −1, −1,1,1,
   −1,1, −1,1, −1, −1, −1, −1, −1,1,1, −1, −1,1,
   −1,1, −1,1,1,1,1];

Each of the fifty-two LTE subcarriers identified above in the LTF_LTE_SCs array by sequence number is set to a corresponding non-zero modulation value in the LTF_LTE_SC_Value array. Again, the fifty-two LTE subcarriers identified above in this example are those that overlap with at least one Wi-Fi subcarrier (or a main lobe thereof) i.e. the Wi-Fi subcarrier(s) normally are used to produce an LTF. Depending on the implementation, there may be more or less LTE subcarriers included in the LTF_LTE_SCs array. In some of these implementations, all other LTE subcarriers (those not identified in the LTF_LTE_SCs array) are set to a zero value (e.g. (0+0$i$). Other possibilities exist for the LTE subcarrier modulation values.

It is important to note that the OFDM1 transmitter 300 may be configured to transmit the first and second OFDM1 signals 320, 322 either at the same or at different times. In implementations where the first OFDM1 signal 320 needs to be generated and/or transmitted on its own (without a concurrent second OFDM1 signal 322 carrying OFDM2 information), the OFDM1 mapping unit 308 is configured to map the OFDM1 transmission chain output (e.g. the predetermined OFDM1 signal) to all of the M OFDM1 subcarriers. When the second OFDM1 signal 322 carrying OFDM2 information needs to be transmitted (without a concurrent first OFDM1 signal 320 carrying OFDM1 information), the OFDM1 mapping unit 308 is configured to map the FDS signal to all of the M OFDM1 subcarriers. In some of those implementations, a switch or other switching means (not shown) may be used to route either the OFDM1 transmission chain output or the FDS signal into the OFDM1 subcarrier mapping unit 308 to selectively produce either the first or second OFDM1 signal 320, 322 so that they can be converted into the time domain in IFFT unit 304 (as time-domain signal 324) and transmitted via the RF unit 306 and antenna 307

In yet another implementation, the OFDM1 transmitter 300 may include circuitry configured to generate the second OFDM1 signal as a time-domain signal. In one example, the circuitry may include the OFDM2 signal generator 312 and TD interpolator 314 configured to produce the second OFDM1 signal as a time-domain OFDM1 signal 326, TDS, to carry the OFDM2 information. In that implementation, when it determines that the OFDM2 information needs to be transmitted, the OFDM1 transmitter 300 generates and routes the TDS signal 326 into the OFDM1 RF unit 306 via a switch (not shown) directly from the TD interpolator 314 or via the signal memory 316. In implementations where the TDS signal 326 is read from the signal memory 316, the circuitry may only include signal memory 316. In other implementations, the stored TDS signal 326 is a predetermined or defined vector of OFDM1 (time-domain) samples (e.g. a vector with M samples) that is representative of predetermined or defined OFDM2 information.

In some implementations, the switch is part of a switching module (not shown) that is configured to determine when OFDM2 information needs to be transmitted and based on that determination, to route the FDS (or TDS) signal containing the OFDM2 information (e.g. the second predetermined OFDM2 signal) to the OFMD1 subcarrier mapping unit 308 (or OFDM1 RF 306) or route the OFDM1 transmission chain output (e.g. the first predetermined OFDM1 signal) for transmission via the RF unit 306.

In other implementations, the switching module controls whether OFDM2 or OFDM1 information is transmitted via the OFDM1 subcarrier mapping unit 308 and/or via RF unit 306. For example, when the switching module determines that OFDM2 information needs to be transmitted (e.g. when a Wi-Fi preamble or CTS packet needs to be sent to reserve the channel for a subsequent LTE transmission), the switching module routes the FDS signal (or TDS signal) containing the OFDM2 information (e.g. the second predetermined OFDM2 signal) to the OFDM1 subcarrier mapping unit 308 (or OFDM1 RF 306) for transmission as a set of OFDM2 symbols. Conversely, when the switching module determines that OFDM1 information needs to be transmitted (e.g. the subsequent LTE transmission), the switching module instead routes the output of the OFDM1 transmission chain 302 containing the OFDM1 information (e.g. the first predetermined OFDM1 signal) to the OFDM1 subcarrier mapping module 308 for transmission via the OFDM1 RF 306 as a set of OFDM1 symbols.

In implementations that require concurrent transmissions, the OFDM1 mapping unit 308 is instead configured to map the OFDM1 transmission chain output to a first subset 282 of the M OFDM1 subcarriers to produce the first OFDM1 signal 320 and the FDS to the second subset 284 to produce the second OFDM1 signal 322. The first and second OFDM1 signals 320, 322 are then coupled to the IFFT unit 304 to produce time-domain signal 324 carrying both the OFDM1 and OFDM2 information and which can be transmitted via the RF unit 306 and antenna 307. It is also important to note that the subcarrier mapping functionality described above could alternatively be implemented in a different location within the OFDM1 transmitter 300. For example, the functionality for mapping the FDS signal to the second subset 828 could be located within the TD interpolator 314. Other possibilities exist.

If the second OFDM1 signal is instead produced as TDS signal 326, the OFDM1 transmitter 300 may optionally include a combiner unit 310 to combine the first and second OFDM1 signals 320, 326 in the time domain. In those implementations, the TD interpolator 314 generates the second OFDM1 signal as TDS signal 326 using the second subset 284 of subcarriers so that it can be combined in combiner 310 with the first OFDM1 signal 320 (assuming it was generated with the first subset 282 in the OFDM1 subcarrier mapping unit 308) for concurrent transmission via the RF unit 306 and antenna 307.

In some implementations, prior to determining that OFDM1 and/or OFDM2 information needs to be transmitted, a channel availability check is performed first (e.g. by a receiver in communication with the OFDM1 transmitter 300) to determine whether the transmission channel or band used is free. This check may be based on whether a carrier wave, signal or energy can be detected in the channel or band of interest (e.g. with a −62 dBm threshold). If no carrier or energy is detected, the OFDM1 transmitter 300 transmits the first and second OFDM1 signals 320, 322 (or 326) concurrently or in sequence. In some implementations, the switching module may rely on a channel availability indication provided by a channel availability unit (not shown) before it can determine that OFDM1 and/or OFDM2 information can be transmitted.

In some implementations, it may be desirable for the OFDM1 transmitter 300 to occupy the channel as soon as possible after the channel availability check to ensure that other receivers do not consider the channel as free before the OFDM1 transmitter had a chance to begin its own OFDM2 transmission. In implementations where a delay is inevitable, the OFDM1 transceiver 300 may be configured to transmit a time-domain signal that can be fed directly into the OFDM1 RF unit 306 until the desired OFDM2 information becomes available for transmission. For example, if the desired OFDM2 information is in the form of a frequency domain signal (FDS) that needs to go through the OFDM1 subcarrier mapping and IFFT units 308, 304 (e.g. after having been generated in the OFDM2 signal generator 312 and/or processed in the TD interpolator 314 and/or the signal memory 316), the switching module may be configured, when it receives a positive channel availability indication, to route a repeatable time domain signal directly into the RF unit 306 until the desired OFDM2 information is ready for transmission. In some implementations, the repeatable time-domain signal is another OFDM1 signal containing OFDM2 information which has a repetitive or cyclical pattern. In one example, the repeatable OFDM2 information is a sequence of LTFs and/or STFs. Other possibilities exist for the repeatable time-domain signal used prior to transmitting the desired OFDM2 information.

FIG. 11 shows a block diagram example of a configuration for the OFDM2 signal generator 312 and OFDM2-OFDM1 TD interpolator 314 of FIG. 10A to generate and interpolate a Wi-Fi signal into an LTE signal in the time domain, in accordance to principles described herein. In this example, a Wi-Fi signal generator 402 includes a 64-point Wi-Fi IFFT unit 406 that is configured to perform an IFFT for each symbol time duration of a frequency-domain Wi-Fi signal 404 carrying pre-determined or defined Wi-Fi information (e.g. a Wi-Fi header or packet). The Wi-Fi signal generator 402 also includes a CP unit 408 that is configured to add a CP to each Wi-Fi symbol generated to create a set of Wi-Fi symbols carrying the pre-determined Wi-Fi information.

The Wi-Fi symbol set is fed into a LTE time-domain interpolator 412 that includes a re-sampling unit 414 configured to resample (e.g. by time-domain interpolation or low pass filtering) the Wi-Fi symbol set to produce a time-domain LTE signal 420 (e.g. C-PRI I/Q data). The LTE time-domain interpolator 412 may, in some implementations, include a padding unit 416 to pad the LTE signal 420 to turn it into an LTE I/Q vector (e.g. the TDS signal of FIG. 10A) that can be processed by conventional LTE RF circuitry (e.g. the OFDM1 RF unit 306 of FIG. 10A). In other implementations, the LTE time-domain interpolator 412 may further include an LTE FFT unit 418 to obtain a corresponding LTE signal 422 in the frequency-domain (e.g. the FDS signal of FIG. 10A) that can be processed by conventional LTE IFFT circuitry (e.g. the OFDM1 IFFT unit 304 of FIG. 10A). In yet other implementations, the LTE FFT unit 418 has an input size equal to the total size of the Wi-Fi symbols in the Wi-Fi symbol set and an output equal to the number of LTE subcarriers (e.g. 2048). Alternatively, the LTE FFT unit 418 used is the same as that used in a conventional LTE receiving chain. Other implementations are possible.

Returning to FIG. 10B, there is shown a different OFDM1 transmitter configuration which can be used if frequency-domain interpolation is preferred. Similarly to the OFDM1 transmitter 300, the OFDM1 transmitter 350 is configured to generate and transmit first and second OFDM1 signals 370 and 372 (or 376) and includes an OFDM1 transmission chain 352, an OFDM1 subcarrier mapping unit 358, an IFFT unit 354, an optional combiner unit 360, an OFDM1 RF unit 356, antenna(s) 357, and circuitry including an OFDM2 signal generator 362, OFDM2-OFDM1 interpolator 364 and/or an OFDM1 signal memory 366.

In some implementations, the OFDM1 transmitter 350 may also optionally include a switch or switching module (not shown) that is configured as described above in relation to FIG. 10A e.g. to determine when OFDM2 information needs to be transmitted (with or without a prior channel availability check). Based on that determination, the switching module is also configured to route the FDS (or TDS) signal containing the OFDM2 information (e.g. the second predetermined OFDM2 signal) to the OFMD1 subcarrier mapping unit 358 (or OFDM1 RF 306) or route the OFDM1 transmission chain output (e.g. the first predetermined OFDM1 signal) for transmission via the RF unit 356. Other possibilities exit for the switching module including all of those described above in relation to the FIG. 10A.

In implementations that require concurrent transmissions, the OFDM1 transmitter 300 may also optionally include a combiner unit 360 to combine the first and second OFDM1 signals 320, 326 in the time domain prior to transmission. In those implementations, the FD interpolator 364 generates the second OFDM1 signal 376 as a time-domain signal TDS using the second subset 284 of subcarriers so that it can be combined in combiner 360 with the first OFDM1 signal 320 for concurrent transmission via the RF unit 306 and antenna 307 (assuming of course that the first OFDM1 signal was generated as described above using the first subset 282 of subcarriers).

FIG. 12 shows a block diagram example of a configuration for the OFDM2-OFDM1 FD interpolator 364 of FIG. 10B denoted as FD interpolation 452 which is configured to interpolate, in the frequency domain, a Wi-Fi signal 456 carrying pre-determined or defined Wi-Fi information (e.g.

a Wi-Fi header or packet) into an LTE signal 470, 472. In this example, the FD interpolation unit 452 includes a symbol interpolator 458 that interpolates on a Wi-Fi symbol-by-symbol basis i.e. one Wi-Fi symbol at a time. In one implementation, the symbol interpolator 458 interpolates the N (e.g. 64) Wi-Fi subcarriers into M (e.g. 2048) LTE subcarriers using the following "sinc" function:

$$\text{LTE\_Subcarrier}(m) = \sum_{n=-32}^{32} \text{Wi-Fi\_subcarrier}(n) \times \text{sinc}\left(\left[m - \left(\frac{312.5}{15}\right)n\right]\right)$$

$$m = -1024, \ldots, 1024$$

where:

$$\text{sinc}(x) = \frac{\sin \pi x}{\pi x}$$

However, this is only one function example for the symbol interpolator 458. Other frequency interpolation functions may be used to map N subcarriers into M LTE subcarriers.

The symbol interpolator 458 takes as input the Wi-Fi signal 456 in the frequency domain that corresponds to one Wi-Fi symbol time duration. The output is fed into an LTE IFFT unit 460 which produces a set of M time-domain samples (e.g. 2048) which span over one LTE symbol duration. In some implementations, the time-domain set of M samples is truncated in truncation unit 464 (e.g. by selecting a subset of samples (e.g. 98)) to correspond to one Wi-Fi symbol duration (e.g. 3.2 μs) thereby producing LTE I/Q data corresponding to the one Wi-Fi symbol duration processed by the symbol interpolator 458. The FD interpolation unit 452 also includes a concatenation unit 464 that concatenates the LTE I/Q data produced with any LTE I/Q data that might have been produced for Wi-Fi symbols previously processed by the interpolator 452. The Wi-Fi symbols are thus processed in the FD interpolation unit 452 until all of the Wi-Fi symbols in the Wi-Fi signal have been processed. The concatenation unit 464 produces a time-domain LTE signal or I/Q vector 470 (e.g. the TDS signal of FIG. 10B) formed of the concatenated LTE I/Q data corresponding to the entire Wi-Fi signal) so that it can then be processed by conventional LTE RF circuitry (e.g. the OFDM1 RF unit 356 of FIG. 10B). The FD interpolating unit 452 may, in some implementations, include an LTE FFT unit 468 to obtain a corresponding LTE signal 472 in the frequency-domain (e.g. the FDS signal of FIG. 10B) that can be processed by conventional LTE IFFT circuitry (e.g. the OFDM1 IFFT unit 354 of FIG. 10B). Alternatively, the LTE FFT unit 468 is the same as that used in a conventional LTE receiving chain. Other implementations are possible.

FIG. 13A shows an example method 600 for the OFDM transmitter 300 of FIG. 10A. In this method, the OFDM transmitter 300 is assumed to be configured for OFDM signal transmissions using a first plurality of subcarriers $M_1$ having a first subcarrier frequency spacing $\Delta f_1$ defining a first symbol duration $T_1$. At step 602, the method 600 includes mapping in the frequency domain a first predetermined OFDM signal to a first subset of a first plurality $M_1$ of subcarriers to produce a first OFDM signal, the first plurality $M_1$ of subcarriers having a first subcarrier frequency spacing $\Delta f_1$ and a first symbol duration $T_1$. At step 604, the method further includes interpolating in the time domain a second predetermined OFDM signal to produce an interpolated OFDM signal associated with the first plurality $M_1$ of subcarriers, the second predetermined OFDM signal being associated with a second plurality of subcarriers $N_2$ having a second subcarrier frequency spacing $\Delta f_2 > \Delta f_1$ and a second symbol duration $T_2 < T_1$. At step 606, the method further includes mapping in the frequency domain the interpolated OFDM signal to a second subset of the first plurality $M_1$ of subcarriers to produce a second OFDM signal, the second subset of subcarriers being different from the first subset. Finally, at step 608, the method includes transmitting, during one or more first symbol durations $T_1$, the first OFDM signal using the first subset of subcarriers and the second OFDM signal using the second subset of subcarriers.

In some implementations, the method 600 includes, prior to mapping the interpolated OFDM signal to the second subset, performing an $M_1$ point FFT of the interpolated OFDM signal. In other implementations, the method 600 further includes performing an $M_1$ point IFFT of the first and second OFDM signals for transmission during one or more first symbol durations $T_1$. In other implementations, the second predetermined OFDM signal includes a plurality of second OFDM symbols, each represented by $N_2$ points where $N_2$ is smaller than $M_1$. In other implementations, the interpolating of the second predetermined OFDM signal includes resampling the predetermined OFDM signal to obtain $M_1$ points. In yet other implementations, the second predetermined OFDM signal is generated using an $N_2$ point IFFT. In other implementations, the second predetermined OFDM signal is read from a memory.

In some implementations, $M_1$ is a number of LTE subcarriers and $N_2$ is a number of Wi-Fi subcarriers. In other implementations, $M_1$=2048, $\Delta f_1$=15 KHz, $T_1$=66.7 us, $N_2$=64, $\Delta f_2$=312.5 KHz and $T_2$=3.2 us. Other implementations are possible.

FIG. 13B shows an example method 700 for the OFDM transmitter 350 of FIG. 10B. In this method, the OFDM transmitter 350 is assumed to be configured for OFDM signal transmissions using a first plurality of subcarriers $M_1$ having a first subcarrier frequency spacing $\Delta f_1$ defining a first symbol duration $T_1$. The method 700 includes a set of steps 702, 704, 706, 708 which are performed for each one of a plurality of OFDM symbols of a second predetermined OFDM signal, the OFDM symbols being associated with a second plurality of subcarriers $N_2$ having a second subcarrier frequency spacing $\Delta f_2 > \Delta f_1$ and a second symbol duration $T_2 < T_1$. First, the method 700 includes at step 702, mapping in the frequency domain a first predetermined OFDM signal to a first subset of a first plurality $M_1$ of subcarriers to produce a first OFDM signal, the first plurality $M_1$ of subcarriers having a first subcarrier frequency spacing $\Delta f_1$ and a first symbol duration $T_1$. At step 704, the method includes interpolating in the frequency domain one OFDM symbol of a second predetermined OFDM signal to produce an interpolated OFDM symbol associated with the first plurality $M_1$ of subcarriers, the second predetermined OFDM signal being associated with a second plurality of subcarriers $N_2$ having a second subcarrier frequency spacing $\Delta f_2 > \Delta f_1$ and a second symbol duration $T_2 < T_1$. The method further includes at step 706 truncating in the time domain the interpolated OFDM symbol (after conversion into the time domain e.g. using an IFFT) to a symbol duration equal to the second symbol duration $T_2$. At step 708, the method includes concatenating in the time domain the truncated OFDM symbol with any previously concatenated OFDM symbol(s) of the predetermined OFDM signal. If at step 710, steps 702-708 were performed for the last of the plurality of OFDM symbols, the method 700 goes to step 712 where it includes mapping in the frequency domain the concatenated OFDM symbol(s) to a second subset of subcarriers from the first plurality $M_1$ of subcarriers, different from the first subset, to produce a second OFDM signal and at step 714, transmitting, during one or more first symbol durations $T_1$, the first OFDM signal using the first subset of subcarriers and the second OFDM signal using the second subset of subcarriers. Otherwise, the method 700 goes back and performs steps 702-708 for the next OFDM symbol until all of the OFDM symbols have been processed.

In some implementations, the method further includes prior to mapping in the frequency domain the concatenated OFDM symbol(s), performing an $M_1$ point FFT of the concatenated OFDM symbol(s). In other implementations, the method 700 further includes performing an $M_1$ point IFFT of the first and second OFDM signals for transmission during one or more first symbol durations $T_1$.

In some implementations, the symbol interpolating is performed in accordance with the following function:

$$\text{Base\_Subcarrier}(m) = \sum_{n=-32}^{32} \text{Second\_Subcarrier}(n) \times \text{sinc}\left(\left[m - \left(\frac{312.5}{15}\right)n\right]\right)$$

$$m = -1024, \ldots, 1024$$

where:

$$\text{sinc}(x) = \frac{\sin \pi x}{\pi x}$$

In some implementations, $M_1$ is a number of LTE subcarriers and $N_2$ is a number of Wi-Fi subcarriers. In other implementations, $M_1$=2048, $\Delta f_1$=15 KHz, $T_1$=66.7 µs, $N_2$=64, $\Delta f_2$=312.5 KHz and/or $T_2$=3.2 us. Other implementations are possible.

Simulation tests have shown that OFDM2 symbol information (e.g. Wi-Fi symbol information) generated as an OFDM1 signal based on the principles described above can be received and demodulated by an OFDM2 receiver (e.g. Wi-Fi) despite the fact that they have been generated by an OFDM1 transmitter (e.g. LTE) with OFDM1 subcarriers, with or without a concurrent OFDM1 transmission. In some implementations, an OFDM2 receiver is configured to receive, using N OFDM2 subcarriers, OFDM2 symbol information generated with M (or less than M) OFDM1 subcarriers. In other implementations, the OFDM2 receiver includes an N-point FFT to receive the OFDM2 symbol information which was generated with an M-point IFFT in the OFDM1 transmitter. In yet other implementations, the OFDM2 receivers is configured to receive, using N OFDM2 subcarriers, OFDM2 symbol information generated with M (or less than M) OFDM1 subcarriers that overlap with at least one of the N subcarriers (or a main lobe thereof). Other possibilities exist for the OFDM2 receiver. In yet other implementations, the OFDM2 symbol information includes predetermined OFDM2 control or packet data which is indicative of one of a transmission length, transmission time, transmission type and a channel reservation time associated with the OFDM2 symbol set, an OFDM1 symbol set transmitted after the OFDM2 symbol set or a combination thereof. Other possibilities exist for the OFDM2 receiver.

FIG. 14A shows a flow chart of another example method 800 for the OFDM transmitters 300, 350 of FIGS. 10A-B in accordance with the principles described herein. At step 802, the method 800 includes generating a first OFDM signal containing data associated with a first OFDM communication protocol where the first OFDM communication protocol is defined to use a first system bandwidth that overlaps with a second system bandwidth associated with a second OFDM communication protocol. At step 804, the method further includes transmitting the first OFDM signal over a non-utilized portion of second system bandwidth.

FIG. 14B shows a flow chart of yet another example method 900 for the OFDM transmitters 300, 350 of FIGS. 10A-B in accordance with the principles described herein. At step 902, the method 900 includes generating a first OFDM signal containing data associated with a first OFDM communication protocol. The first OFDM communication protocol is defined to use a first system bandwidth that overlaps with a second system bandwidth associated with a second OFDM communication protocol. If a determination is made at step 904 that another transmission is in progress in the second system bandwidth (e.g. channel is busy), the method proceeds to step 906 and includes transmitting the first OFDM signal over a non-utilized portion of second system bandwidth. If, on the other hand, a determination is made that no other transmission is in progress (e.g. channel is idle), the method includes generating at step 908 a second OFDM signal containing data associated with the second OFDM communication protocol and transmitting at step 910 the second OFDM signal over the second system bandwidth where the second OFDM signal is indicative of one of a transmission length, transmission time, transmission type and a channel reservation time associated with at least one of the first and second OFDM signals. Finally, the method includes at step 912 transmitting the second OFDM signal over the second system bandwidth.

In some implementations of the methods 800, 900 of FIG. 14A-B, the first OFDM signal is transmitted using a first subset of a first plurality of subcarriers having a first subcarrier frequency spacing where the first subset is located in the non-utilized portion of the second system bandwidth. In other implementations, the second OFDM signal is transmitted using either a second plurality of subcarriers having a second subcarrier frequency spacing different than the first subcarrier frequency spacing or using a second subset of subcarriers from the first plurality of subcarriers, different from the first subset. In those implementations, the second subset or the second plurality of subcarriers is located in a utilized portion of the second system bandwidth. In yet other implementations, the first OFDM signal is transmitted at a power level different than a power level for the second OFDM signal. In yet other implementations, the first OFDM signal is an LTE signal and the second OFDM signal includes one of a CTS frame, an STF, an LTF and a SIG.

Figure 15A:
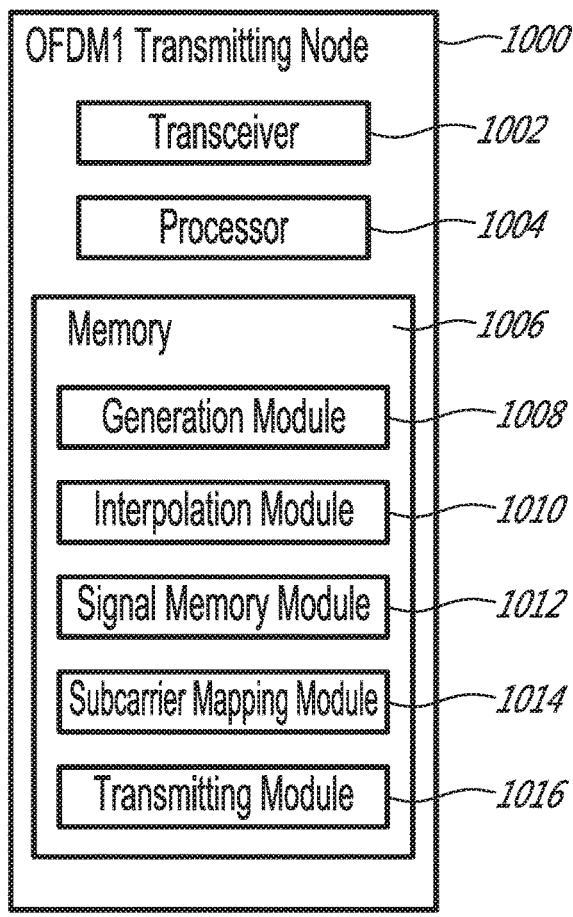
FIGS. 15A-B show a block diagram of exemplary embodiments of OFDM transmitting and receiving nodes configured in accordance with principles described herein.
Figure 15B:
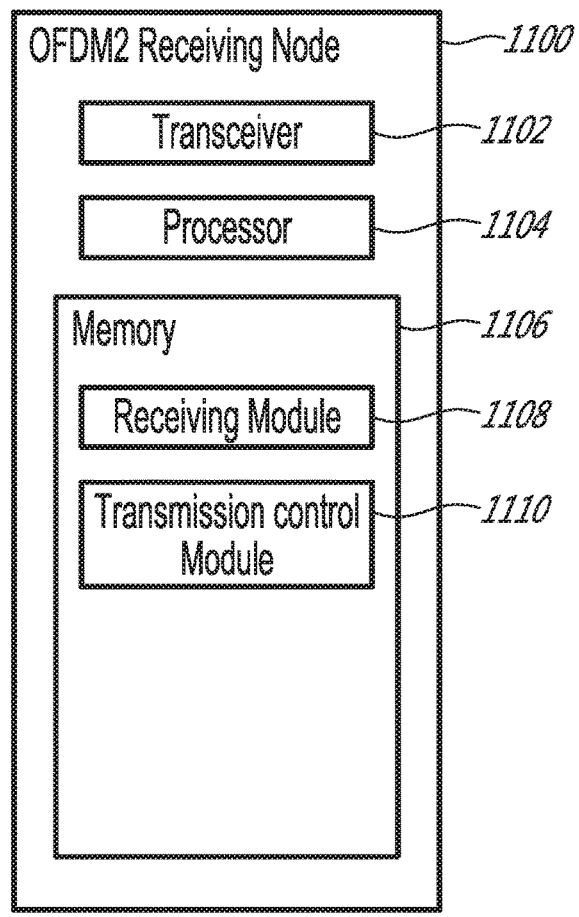

FIGS. 15A-B are block diagrams of exemplary embodiments of respectively a (first) OFDM1 transmitting node 1000 (e.g. an LTE transmitter) and an OFDM2 receiving node (e.g. a Wi-Fi receiver) configured respectively to transmit and receive OFDM1 signals in accordance with the principles of the present disclosure.

As illustrated in FIG. 15A, OFDM1 transmitting node 1000 (e.g. configured for OFDM1 signal transmissions) includes a transceiver 1002, one or more processor(s) 1004, memory 1006 which includes one or more of a generation module 1008, an interpolation module 1010, a signal memory module 1012, a switching module (not shown), a subcarrier mapping module 1014 and a transmitting module

1016. In one embodiment, the transceiver 1002 may be replaced by a transmitter and a receiver (not shown). The generation module 1008 is configured to perform the signal generation functionality described above which includes generating a first predetermined OFDM1 signal containing OFDM1 information (e.g. LTE data that includes one or more of the information fields or elements of a Wi-Fi header/CTS packet to reserve the Wi-Fi channel for a subsequent LTE transmission)) and a predetermined OFDM2 signal containing predetermined OFDM2 signal (e.g. a Wi-Fi header, or CTS packet). The interpolation module 1010 is configured to perform the interpolation functionality described above, which includes interpolating the predetermined OFDM2 signal generated to produce a second predetermined OFDM1 signal that contains the predetermined or defined OFDM2 information. The signal memory module 1012 is configured to perform the storing functionality described above which includes storing the second predetermined OFDM1 signal that contains the OFDM2 information. The switching module (not shown) is configured to perform the switching functionality described above, which includes controlling whether and when OFDM2 or OFDM1 information is transmitted via the transmitting module 1016. The subcarrier mapping module 1014 is configured to perform the mapping functionality described above, which includes mapping the first predetermined OFDM1 signal containing the OFDM1 information to all (or a first subset) of OFDM1 subcarriers to produce a first OFDM1 signal and mapping the second predetermined OFDM1 signal containing the OFDM2 information to all (or a second subset) to produce a second OFDM1 signal. The transmitting module 1016 is configured to perform the transmitting functions described above which includes transmitting the first OFDM1 signal over a non-utilized portion of second system bandwidth signals and transmitting the second OFDM1 signal over (a used portion of) the second system bandwidth.

Depending on the implementation, not all of the generation, interpolation, storing, switching and/or subcarrier mapping functions need to be performed as noted above and as such, some of these modules may be optional. For example, in one implementation where OFDM1 signals are transmitted using non-utilized portion(s) of an OFDM2 system bandwidth, the memory 1006 may only include the generation module 1008 and the transmitting module 1016 respectively performing the functions described above. In another implementation where both OFDM1 and OFDM2 information is transmitted, the OFDM2 information is stored in the signal memory module 1012 in advance, and the memory 1006 only includes the signal memory module 1012, the subcarrier mapping module 1014 and the transmitting module 1016 respectively performing the functions described above. The generation module 1008, interpolation module 1010, signal memory module 1012, switching module, subcarrier mapping module 1014, and transmitting module 1016 are implemented at least partially in the memory 1006 in the form of software or (computer-implemented) instructions executed by the processor(s) 1004 within the OFDM1 transmitting node 1000 or distributed across two or more nodes (e.g., the OFDM1 transmitting node 1000 and another node). In another example, the processor(s) 1004 includes one or more hardware components (e.g., Application Specific Integrated Circuits (ASICs)) that provide some or all of the generation, interpolation, storing, switching, mapping and transmitting functionality described above. In another embodiment, the processor(s) 1004 include one or more hardware components (e.g., Central Processing Units (CPUs)), and some or all of the generation, interpolation, storing, switching, mapping and transmitting functionality described above is implemented in software stored in, e.g., the memory 1006 and executed by the processor 1004. In yet another embodiment, the processor(s) 1004 and memory 1006 form processing means (not shown) configured to perform the generation, interpolation, storing, switching, mapping and transmitting functionality described above.

As illustrated in FIG. 15B, OFDM2 receiving node 1100 includes a transceiver 1102, one or more processor(s) 1104, and memory 1106 which includes a receiving module 1108, and a transmission control module 1110. In one embodiment, the transceiver 1102 may be replaced by a transmitter and a receiver (not shown). The receiving module 1108 is configured to perform the receiving functionality described above which, as noted above includes receiving using OFDM2 subcarriers, an OFDM1 signal containing OFDM2 information (e.g. a Wi-Fi header or CTS packet) transmitted from an OFDM1 transmitting unit using OFDM1 subcarriers. The transmission control module 1110 which may be optional depending on the implementation, is configured to perform the transmission control functionality described above, which includes determining if the OFDM1 signal contains data indicative of one of a transmission length, a transmission time, a transmission type, and/or a channel reservation time associated with at least one of the first and second OFDM signals and if so, refraining from transmitting based on the data received.

The receiving module 1108 and transmission control module 1110 are implemented at least partially in the memory 1106 in the form of software or (computer-implemented) instructions executed by the processor(s) 1104 within the OFDM2 receiving node 1100 or distributed across two or more nodes (e.g., the OFDM2 receiving node 1100 and another node or device). In another example, the processor(s) 1104 includes one or more hardware components (e.g., Application Specific Integrated Circuits (ASICs)) that provide some or all of the receiving and transmission control functionality described above. In another embodiment, the processor(s) 1104 include one or more hardware components (e.g., Central Processing Units (CPUs)), and some or all of the receiving and transmission control functionality described above is implemented in software stored in, e.g., the memory 1106 and executed by the processor 1104. In yet another embodiment, the processor(s) 1104 and memory 1106 form processing means (not shown) configured to perform the receiving and transmissions control functionality described above.

Although not shown, an OFDM1 receiving node may be structured in a manner similar to the OFDM2 receiving node 1100 to receive and process an OFDM1 signal transmitted using non-utilized portion(s) of an OFDM2 system bandwidth. As such, it may include a transceiver (or separate transmitter/receiver), one or more processor(s), and a memory which includes at least a receiving module. The receiving module is configured to receive, using OFDM1 subcarriers, an OFDM1 signal transmitted using non-utilized portion(s) of an OFDM2 system bandwidth. As noted above, the OFDM1 signal may be predetermined LTE data that includes one or more information fields or elements of a Wi-Fi header or CTS packet that has been sent concurrently to Wi-Fi receivers over (used portions of) the Wi-Fi system bandwidth for example, to reserve the channel for a subsequent LTE transmission. Other implementations are possible for OFDM1 receivers configured to receive an OFDM1 signal transmitted over non-utilized portion(s) of an OFDM2 system bandwidth.

Figure 16A:
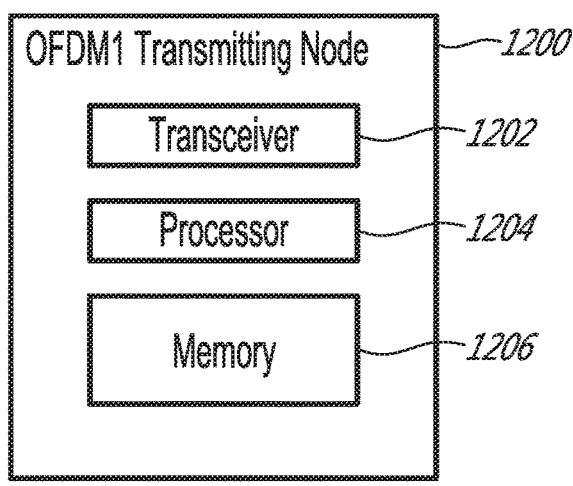
FIGS. 16A-B show a block diagram of other exemplary embodiments of OFDM transmitting and receiving nodes configured in accordance with the principles described herein.
Figure 16B:
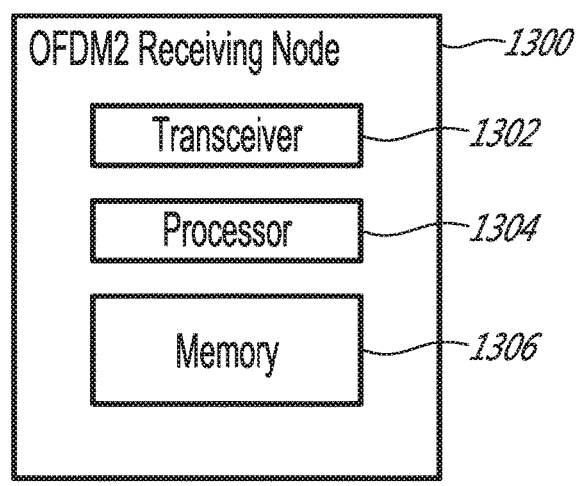

FIGS. 16A-B show a variant for each of the OFDM transmitting and receiving node examples of FIGS. 15A-B, denoted respectively as OFDM transmitting node 1200, and ODFM receiving node 1300. Each of the nodes, 1200, 1300 includes a transceiver 1202, 1302 and circuitry containing (computer-implemented) instructions which when executed by one or more processor(s) 11204, 1304 cause their respective node 1200, 1300 to perform some or all of the generation, interpolation, storing, mapping, transmitting, receiving and transmission control functionality described above. In yet another variant, the circuitry includes the respective memory 1206, 1306 and processor(s) 1204, 1304 which, similarly to the example nodes 1000 and 1100 of FIGS. 15A-B may be implemented in many different ways. In one example, the memories 1206, 1306 contain instructions which, when executed, cause the respective node 1200, 1300 to perform some or all of their generation, interpolation, storing, mapping, transmitting, receiving and transmission control functionality described above. Other implementations are possible.

Other Embodiments

In one broad aspect, there is provided a method for an OFDM transmitter or transmitting node configured for OFDM signal transmissions. The method includes generating a first OFDM signal containing data associated with a first OFDM communication protocol, where the first OFDM communication protocol is defined to use a first system bandwidth that overlaps with a second system bandwidth associated with a second OFDM communication protocol. The method further includes transmitting the first OFDM signal over a non-utilized portion of the second system bandwidth.

In one implementation, the first OFDM signal is transmitted using a first subset of a first plurality of subcarriers having a first subcarrier frequency spacing, where the first subset is located in the non-utilized portion of the second system bandwidth. In another implementation, the method further includes generating a second OFDM signal containing data associated with the second OFDM communication protocol, and transmitting the second OFDM signal over the second system bandwidth.

In yet another implementation, the first and second OFDM signals are transmitted at a same or a different time. In yet another implementation, transmitting the first OFDM signal includes transmitting the first OFDM signal over the non-utilized portion of the second system bandwidth if another transmission is in progress in the second system bandwidth. In yet another implementation, if no other transmission is in progress in the second system bandwidth, the method further includes, prior to transmitting the first OFDM signal, transmitting the second OFDM signal over the second system bandwidth, where the second OFDM signal is indicative of one of a transmission length, transmission time, transmission type and a channel reservation time associated with at least one of the first and second OFDM signals, and where the first OFDM signal is subsequently transmitted over the second system bandwidth. In yet another implementation, the second OFDM signal is transmitted using a second plurality of subcarriers having a second subcarrier frequency spacing different than the first subcarrier frequency spacing, where the second plurality of subcarriers is located in a utilized portion of the second system bandwidth. In yet another implementation, the second OFDM signal is transmitted using a second subset of subcarriers from the first plurality of subcarriers, different from the first subset, where the second subset being located in the utilized portion of the second system bandwidth.

In yet another implementation, the first and second OFDM signals are generated in one of a time domain and a frequency domain, based on respective first and second predetermined OFDM signals containing data associated with the first and second OFDM communication protocols. In yet another implementation, generating the first OFDM signal includes mapping the first predetermined OFDM signal to subcarriers in at least the first subset and where generating the second OFDM signal includes mapping the second predetermined OFDM signal to subcarriers in at least the second subset. In yet another implementation, the second subset includes at least one subcarrier overlapping in frequency with a subcarrier of the second plurality of subcarriers.

In yet another implementation, generating the second OFDM signal further includes generating the second predetermined OFDM signal, and interpolating the second predetermined OFDM signal generated using the first plurality of subcarriers to produce an interpolated OFDM signal that can be mapped to subcarriers in the second subset.

In yet another implementation, the first OFDM communication protocol includes an LTE protocol and the second OFDM communication protocol includes an 802.11 protocol. In yet another implementation, the first OFDM signal includes an LTE signal and the second OFDM signal includes one of a Clear To Send (CTS) frame, a Short Training Field (STF), a Long Training Field (LTF), and a Signal Field (SIG). In yet another implementation, the first OFDM signal is transmitted at a power level different than a power level for the second OFDM signal.

In another broad aspect, there is provided an OFDM transmitter or transmitting node configured for OFDM signal transmissions. The OFDM transmitter includes circuitry containing instructions which, when executed, are configured to cause the transmitter to perform any of the method embodiments described above.

In yet another broad aspect, there is provided a non-transitory computer readable memory configured to store executable instructions for an OFDM transmitter or transmitting node configured for OFDM signal transmissions. The executable instructions when executed by a processor are configured to cause the OFDM transmitter to perform any of the method embodiments described above.

In yet another broad aspect, there is provided an OFDM transmitter or transmitting node configured OFDM signal transmissions The OFDM transmitter includes a transceiver, a processor and a memory containing a generation module configured to generate a first OFDM signal containing data associated with a first OFDM communication protocol, where the first OFDM communication protocol is defined to use a first system bandwidth that overlaps with a second system bandwidth associated with a second OFDM communication protocol. The memory also contains a transmitting module configured to transmit the first OFDM signal over a non-utilized portion of the second system bandwidth.

In one implementation, the first OFDM signal is transmitted using a first subset of a first plurality of subcarriers having a first subcarrier frequency spacing, where the first subset is located in the non-utilized portion of the second system bandwidth. In another implementation, the memory also contains a generation module configured to generate a second OFDM signal containing data associated with the second OFDM communication protocol, and where the transmitting module is configured to transmit the second OFDM signal over the second system bandwidth.

In yet another implementation, the first and second OFDM signals are transmitted at a same or a different time. In yet another implementation, the transmitting module is configured to transmit the first OFDM signal over the non-utilized portion of the second system bandwidth if another transmission is in progress in the second system bandwidth. In yet another implementation, if no other transmission is in progress in the second system bandwidth, the transmitting module is further configured to, prior to transmitting the first OFDM signal, transmitting the second OFDM signal over the second system bandwidth, where the second OFDM signal is indicative of one of a transmission length, transmission time, transmission type and a channel reservation time associated with at least one of the first and second OFDM signals, and where the first OFDM signal is subsequently transmitted over the second system bandwidth. In yet another implementation, the second OFDM signal is transmitted using a second plurality of subcarriers having a second subcarrier frequency spacing different than the first subcarrier frequency spacing, where the second plurality of subcarriers is located in a utilized portion of the second system bandwidth. In yet another implementation, the second OFDM signal is transmitted using a second subset of subcarriers from the first plurality of subcarriers, different from the first subset, where the second subset being located in the utilized portion of the second system bandwidth.

In yet another implementation, the first and second OFDM signals are generated in one of a time domain and a frequency domain, based on respective first and second predetermined OFDM signals containing data associated with the first and second OFDM communication protocols. In yet another implementation, the generation module is further configured to generate the first OFDM signal by mapping the first predetermined OFDM signal to subcarriers in at least the first subset and generate the second OFDM signal by mapping the second predetermined OFDM signal to subcarriers in at least the second subset. In yet another implementation, the second subset includes at least one subcarrier overlapping in frequency with a subcarrier of the second plurality of subcarriers.

In yet another implementation, the generation module is further configured to generate the second predetermined OFDM signal, and where the memory also contains an interpolation module configured to interpolate the second predetermined OFDM signal generated using the first plurality of subcarriers to produce an interpolated OFDM signal that can be mapped to subcarriers in the second subset.

In yet another implementation, the first OFDM communication protocol includes an LTE protocol and the second OFDM communication protocol includes an 802.11 protocol. In yet another implementation, the first OFDM signal includes an LTE signal and the second OFDM signal includes one of a CTS frame, an STF, an LTF, and a SIG. In yet another implementation, the first OFDM signal is transmitted at a power level different than a power level for the second OFDM signal.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the present disclosure.

The invention claimed is:

1. A method for an Orthogonal Frequency Division Multiplexing, OFDM, transmitter configured for OFDM signal transmissions, the method comprising:
   generating a first OFDM signal containing data associated with a first OFDM communication protocol, the first OFDM communication protocol defined to use a first system bandwidth that overlaps with a second system bandwidth associated with a second OFDM communication protocol;
   transmitting the first OFDM signal over a non-utilized portion of the second system bandwidth; and
   generating a second OFDM signal containing data associated with the second OFDM communication protocol, and transmitting the second OFDM signal over the second system bandwidth,
   wherein transmitting the first OFDM signal comprises transmitting the first OFDM signal over the non-utilized portion of the second system bandwidth if another transmission is in progress in the second system bandwidth.

2. The method of claim 1 wherein the first OFDM signal is transmitted using a first subset of a first plurality of subcarriers having a first subcarrier frequency spacing, the first subset being located in the non-utilized portion of the second system bandwidth.

3. The method of claim 1 wherein the first and second OFDM signals are transmitted at a same or a different time.

4. The method of claim 1 wherein if no other transmission is in progress in the second system bandwidth, the method further comprising, prior to transmitting the first OFDM signal, transmitting the second OFDM signal over the second system bandwidth, wherein the second OFDM signal is indicative of one of a transmission length, transmission time, transmission type and a channel reservation time associated with at least one of the first and second OFDM signals, and wherein the first OFDM signal is subsequently transmitted over the second system bandwidth.

5. The method of claim 1 wherein the second OFDM signal is transmitted using a second plurality of subcarriers having a second subcarrier frequency spacing different than the first subcarrier frequency spacing, the second plurality of subcarriers being located in a utilized portion of the second system bandwidth.

6. The method of claim 1 wherein the first and second OFDM signals are generated in one of a time domain and a frequency domain, based on respective first and second predetermined OFDM signals containing data associated with the first and second OFDM communication protocols.

7. The method of claim 6 wherein generating the second OFDM signal further comprises generating the second predetermined OFDM signal, and interpolating the second predetermined OFDM signal generated using the first plurality of subcarriers to produce an interpolated OFDM signal that can be mapped to subcarriers in the second subset.

8. The method of claim 1 wherein the first OFDM signal comprises an LTE signal and the second OFDM signal comprises one of a Clear To Send (CTS) frame, a Short Training Field (STF), a Long Training Field (LTF), and a Signal Field (SIG).

9. An Orthogonal Frequency Division Multiplexing, OFDM, transmitter configured for OFDM signal transmissions, the OFDM transmitter having circuitry containing instructions which, when executed, are configured to cause the OFDM transmitter to:
   generate a first OFDM signal containing data associated with a first OFDM communication protocol, the first OFDM communication protocol defined to use a first system bandwidth that overlaps with a second system bandwidth associated with a second OFDM communication protocol, and transmit the first OFDM signal over a non-utilized portion of the second system bandwidth, wherein the instructions which, when executed, are further configured to cause the OFDM transmitter to generate a second OFDM signal containing data associated with the second OFDM communication protocol, and to transmit the second OFDM signal over the second system bandwidth, wherein to transmit the first OFDM signal, the instructions are further configured to cause the OFDM transmitter to transmit the first OFDM signal over the non-utilized portion of the second system bandwidth if another transmission is in progress in the second system.

10. The OFDM transmitter of claim 9 wherein the first OFDM signal is transmitted using a first subset of a first plurality of subcarriers having a first subcarrier frequency spacing, the first subset being located in the non-utilized portion of the second system bandwidth.

11. The OFDM transmitter of claim 9 wherein the first and second OFDM signals are transmitted at a same or a different time.

12. The OFDM transmitter of claim 9 wherein if no other transmission is in progress in the second system bandwidth, the instructions are further configured to cause the OFDM transmitter to transmit the second OFDM signal over the second system bandwidth prior to transmitting the first OFDM signal, wherein the second OFDM signal is indicative of one of a transmission length, transmission time, transmission type and a channel reservation time associated with at least one of the first and second OFDM signals, and wherein the first OFDM signal is subsequently transmitted over the second system bandwidth.

13. The OFDM transmitter of claim 9 wherein the second OFDM signal is transmitted using a second plurality of subcarriers having a second subcarrier frequency spacing different than the first subcarrier frequency spacing, the second plurality of subcarriers being located in a utilized portion of the second system bandwidth.

14. The OFDM transmitter of claim 9 wherein the first and second OFDM signals are generated in one of a time domain and a frequency domain, based on respective first and second predetermined OFDM signals containing data associated with the first and second OFDM communication protocols.

15. The OFDM transmitter of claim 14 wherein to generate the second OFDM signal, the instructions are further configured to cause the OFDM transmitter to generate the second predetermined OFDM signal, and interpolate the second predetermined OFDM signal generated using the first plurality of subcarriers to produce an interpolated OFDM signal that can be mapped to subcarriers in the second subset.

16. The OFDM transmitter of claim 9 wherein the first OFDM signal comprises an LTE signal and the second OFDM signal comprises one of a CTS frame, a STF, a LTF, and a SIG.

* * * * *